US009811157B2

(12) United States Patent
Rijnders

(10) Patent No.: US 9,811,157 B2
(45) Date of Patent: Nov. 7, 2017

(54) METHOD FOR GAZE TRACKING

(71) Applicant: COGISEN S.R.L., Naples (IT)

(72) Inventor: Christiaan Erik Rijnders, Rome (IT)

(73) Assignee: COGISEN S.R.L., Naples (IT)

( * ) Notice: Subject to any disclaimer, the term of this patent is extended or adjusted under 35 U.S.C. 154(b) by 327 days.

(21) Appl. No.: 14/247,589

(22) Filed: Apr. 8, 2014

(65) Prior Publication Data
US 2014/0300538 A1    Oct. 9, 2014

(30) Foreign Application Priority Data

Apr. 8, 2013    (EP) .................................... 13162802

(51) Int. Cl.
*G06F 3/01*    (2006.01)
*G06K 9/00*    (2006.01)

(52) U.S. Cl.
CPC ........... *G06F 3/013* (2013.01); *G06K 9/0061* (2013.01); *G06K 9/00335* (2013.01); *G06K 9/00597* (2013.01)

(58) Field of Classification Search
None
See application file for complete search history.

(56) References Cited

U.S. PATENT DOCUMENTS

| | | | |
|---|---|---|---|
| 6,437,758 B1 * | 8/2002 | Nielsen ................... | G06F 3/013 345/7 |
| 2009/0027037 A1 * | 1/2009 | Strnad ...................... | H02J 3/38 324/76.11 |
| 2009/0238466 A1 * | 9/2009 | Golan .................. | G06K 9/4609 382/199 |

(Continued)

OTHER PUBLICATIONS

K Manikantan et al.: "DFT domain Feature Extraction using Edge-based Scale Normalization for Enhanced Face Recognition", Journal of Advanced Computer Science and Technology, vol. 1, No. 3, Aug. 1, 2012 (Aug. 1, 2012), pp. 134-166, XP055075087, ISSN: 2227-4332).*

(Continued)

*Primary Examiner* — Frederick Bailey
(74) *Attorney, Agent, or Firm* — Steinfl & Bruno LLP

(57) ABSTRACT

A method for gaze tracking achieves high performances at the same time requiring both limited processor engagement and reduced power, so as to be particularly but not exclusively fit for mobile uses is described. The method includes the steps of: obtaining a digital video stream of a face through a camera, wherein eyes or pupils are identified in corresponding boxes in the spatial domain, the size thereof being function of the face position and orientation relative to said camera, the content of the boxes being the input for the further calculations; transferring the content of the boxes to the frequency domain; applying to the boxes transferred to the frequency domain one or more sparse zones, covering together a fraction of the boxed area transferred to the frequency domain, and a filtering kernel, at least partially overlapping the sparse zones; performing a multiplication between the frequency data within each sparse zone and the kernel, combining the results in a single value for each sparse zone; and repeating the above steps obtaining for each frame said single value, fluctuation of the single value being representative of gaze direction changes along time.

19 Claims, 22 Drawing Sheets

(56) References Cited

U.S. PATENT DOCUMENTS

| | | | |
|---|---|---|---|
| 2010/0010370 A1* | 1/2010 | De Lemos | A61B 3/112 |
| | | | 600/558 |
| 2013/0187773 A1* | 7/2013 | Tsou | G06F 21/31 |
| | | | 340/540 |
| 2013/0258089 A1* | 10/2013 | Lyons | H04N 5/23212 |
| | | | 348/77 |
| 2014/0010471 A1* | 1/2014 | Flanders | G06T 5/002 |
| | | | 382/255 |
| 2014/0043227 A1* | 2/2014 | Skogo | G06F 1/325 |
| | | | 345/156 |
| 2014/0267771 A1* | 9/2014 | Lawler | G06K 9/00597 |
| | | | 348/169 |
| 2014/0310256 A1* | 10/2014 | Olsson | G06F 3/013 |
| | | | 707/706 |

OTHER PUBLICATIONS

European Search Report for European Application No. 13162802 filed on Apr. 8, 2013 in the name of COGISEN S.R.L. dated Sep. 24, 2013.

Hsieh, Chi-Wen et al., et al., The study of the relationship between electro-oculogram and the features of closed eye motion, Proc. $5^{th}$ Int'l Conf. Info. Tech. & App. In Biomed. 2008, pp. 420-423.

Hsieh, Chi-Wen et al., et al., Analysis of closed eyes motion using a wireless eye-mask, Med. Bio. Eng. Comput. 2007, 45: 365-374.

Kisacanin, et al., Real-time vision for human-computer interaction, Springer Science + Business Media 2005, pp. 146-149.

Leng, et al., Dynamic weighted discrimination power analysis: A novel approach for face and palmpritn recognition in DCT domain, Int'l J. Physical Science 2010, 5: 2543-2554.

\* cited by examiner

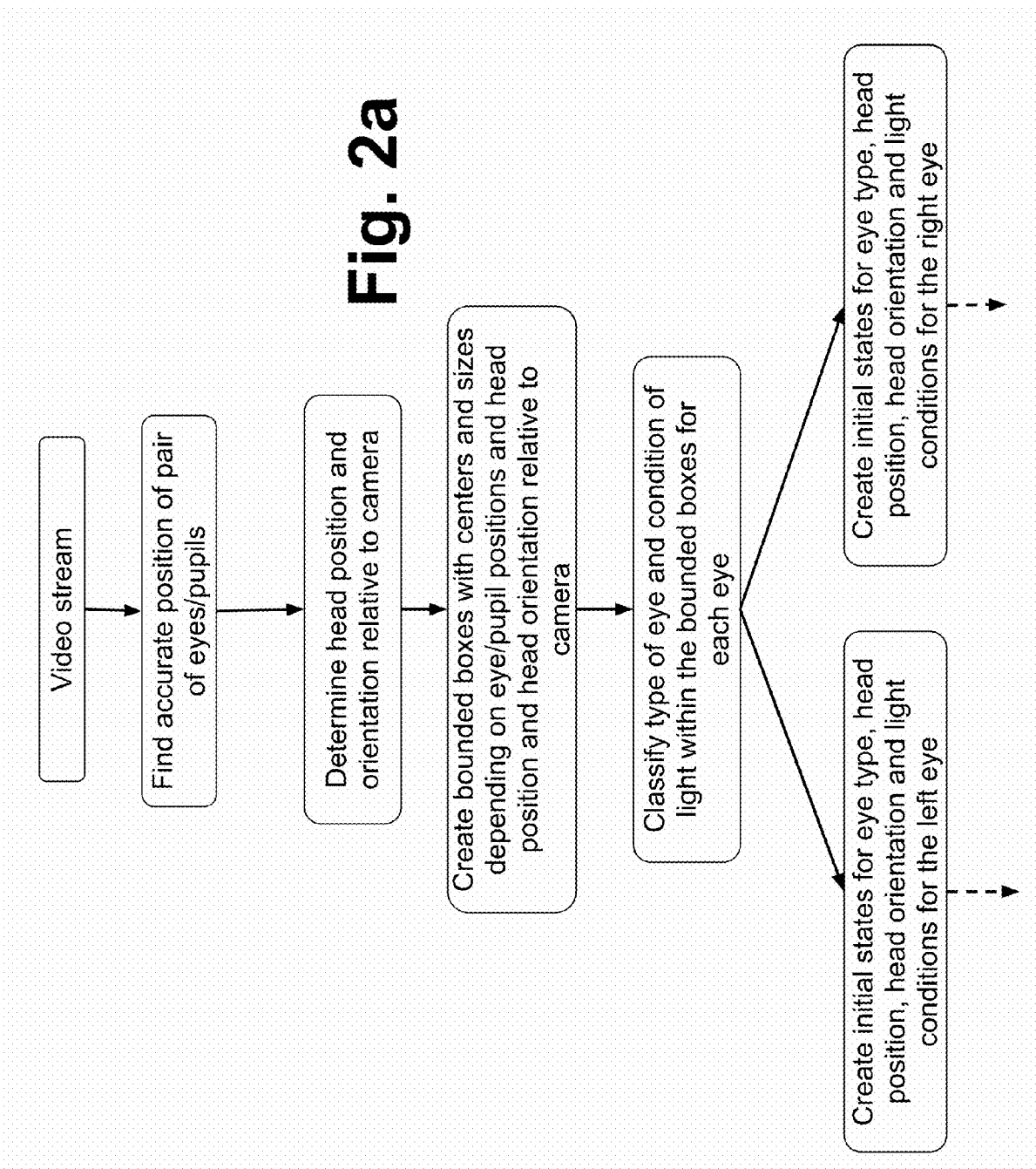

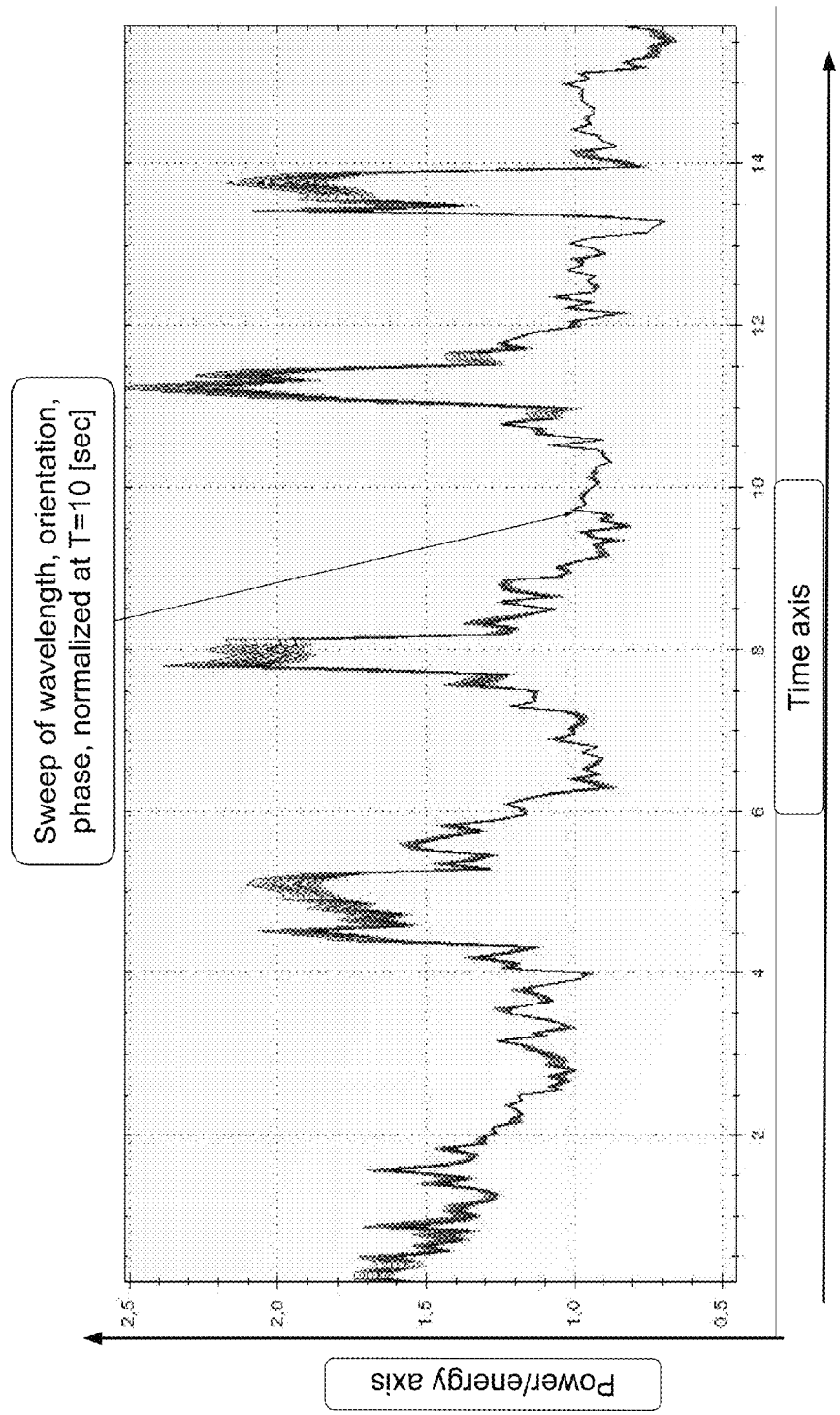

METHOD FOR GAZE TRACKING

CROSS REFERENCE TO RELATED APPLICATIONS

The present application claims priority to EPO application EP 13162802 filed on Apr. 8, 2014, the contents of which are incorporated herein by reference in their entirety.

BACKGROUND

1. Field

The present disclosure is related to a method for gaze tracking, apt to be built in different devices, such as smartphones, tablets, personal computers, television screens, or in any environment where the gaze can be used to control the operation of any kind of apparatus, such as vehicles and so on. Generally speaking, the present method for gaze tracking aims to be applied to interactive interfaces and operating systems.

The present disclosure also concerns a method for operating a device, provided with at least a digital camera producing a video stream, to obtain a gaze tracking when a face is captured in said video streaming, through both the camera and the processor of the device.

2. Description of the Prior Art

Current studies and products using the analysis of gaze patterns are mostly implemented in controlled laboratory type situations.

For example, many studies are done to determine the effectiveness of website layouts: such controlled tests with subjects and the known issues thereof make these subjects conscious of being tested, thus changing their behaviour and influencing the type of results that are desired from the experiment.

Current gaze tracking solutions predominantly work using the projection of infrared light, which creates reflections within and on the eye, which can be tracked by algorithms such as blob detection. The number of glints can be increased with extra sources of infrared, to improve the tracking and to allow some tolerance for head movements.

Gaze tracking using infrared typically requires a remote setup where the camera is placed further away from the user, usually below the screen. It requires that the light sources for the IR illumination be placed in positions where the glints are clearly visible when looking at the four corners of the screen.

Solutions using infrared for gaze tracking require a number of infrared projections so as to have a reasonable box of movement of the head relative to the camera. Even if creating a larger box, any changes in lighting conditions will mean that re-calibration is required.

Solutions, which do not use infrared reflection, are mostly based on head-tracking, using the recognition and following of features of the face, with methods such as the so-called Active Appearance models. However, the use of head orientation tracking for directional input is not the same thing as the gaze tracking, which is the following of eye direction only, regardless of the head's movement.

Further known methods use the classification of eye gaze maximum position, recognizing the difference between eyes in up/down/left/right orientation; such solution can only be used for identifying upside-down or left-right scrolling directions, something truly different than an accurate gaze tracking.

Methods not using infrared often seek to use the stereo vision to increase accuracy, which in any case remains limited, but making the hardware more complex.

Other non-infrared methods for the gaze tracking are substantially based on the recognition of face features such as eyebrows, chin, pupil, corners of eyes and so on. They necessarily have a lower accuracy, due to the difficulty in recognizing the corners of eyes, and a lower robustness to light changes and to different types of faces. They also require that the full face is visible. Also the accuracy for upside/down movements is lower with such methods, since the relative vertical movement of the pupil is small while the eyelid position will also adapt itself to the eye movement.

Further, there are a number of barriers preventing the integration of infrared hardware in mobile devices. Integrating gaze tracking using infrared means higher costs and extra battery drain. Plus, high research and development costs are generally required to create the miniaturized hardware, with current state-of-the-art hardware still being too large to be integrated into mobile devices, especially because reasonably powerful infra-red light more than one source of infra-red light are required.

The same is true in the case of using an extra video camera for stereo vision, as it adds hardware costs and extra battery drain to the mobile device, making a software solution much more desirable.

Although there is no definitive study yet to conclude if continued exposure from a short distance to infrared light can result in eye damage, customers might have concerns, considering also the fact that young children become mobile device users sooner, when the damage is usually considered proportional to the exposure time to the IR light, hours per day for some user.

Methods such as stereo vision are used to improve this accuracy, but any expert in the field of gaze tracking will realize that, even with a perfect recognition of pupil positions and eye corners, the accuracy and resolution of the gaze direction resulting from calculations depending on pixel positions will always be too limited to be of practical use, and in the spatial domain the methods will be inherently slow. A method of this kind will have trouble in recognizing the difference between a pupil movement on the screen due to gaze direction change or a movement of the head. Also recognizing up-down movement of the eye will be troublesome with such methods as the eyelid has a great effect on the visual image of the eye than the pupil.

The potential accuracy of techniques which use the projection of infrared eyes is also limited by uncertainty factors regarding the curvature on the inside of the eye and the outside of the eye. For this reason, methods using infrared projection often require several infrared projectors and a careful calibration procedure. It also requires for the light conditions to remain stable after calibration and for the user to remain in a relatively small movement box in front of the screen. This makes the implementation of infrared in mobile devices for gaze tracking which use the recognition of infrared glint in the eye unpractical for full mobility real world uses on mobile devices.

A software-only solution for the gaze tracking is also required in consideration of another remarkable drawback involved in using infra-red projection for gaze tracking: i.e. the camera infrared filter has to be removed from the camera lens so as to allow the capture of the infra-red reflection on the eyes. Removing the infrared filter will deteriorate the quality of photos taken by the devices. Considering the importance placed on the quality of photos taken by users of mobile devices, this is also a highly limiting factor for the adaptation of infrared projection for gaze tracking.

In any case, a man skilled in the art of gaze tracking recognizes that, with a face at a distance of about 30 centimeters from a mobile screen, the pupil will only be moving over the screen with a gaze movement from side to side of a small screen of a mobile device, corresponding to a small number of pixels of the image captured by a camera placed beside the screen itself. Further, attempting to use methods based on image processing in the spatial domain requires not only the pupil to be recognized but that the corners of the eyes must be clearly identified.

However, the corners of the eyes are difficult to recognize with recognition common methods, such as Viola-Jones, quickly resulting in several pixels of error.

Object recognition methods mostly use the analysis of pixel level information in the spatial domain, which are mostly converted to grey-scale. Such methods, such as extracting features with the Viola Jones algorithm, require the use of cascade classifiers such as Adaboost. Other methods extracting geometrical features such as Active Shape Models rely on the correlation between classified feature points and a 3D shape model. These methods inherently require relatively heavy calculations and a lot of work to optimize.

Other methods that are used commonly are for example Hidden Markov Models or back propagation Neural Networks, both being complex.

All such methods also are generally difficult to engineer and optimize and quite much work to be adapted to follow and take advantage of the latest hardware developments such as multi-core processing or advances in GPU technology.

So, pupil position recognition in the spatial domain with errors of a few pixels must be compared with eye corner recognition, which will quickly have several pixels of error, to capture a pupil movement relative to the eye corners which in total is only several pixels.

This does not even consider the effects of head orientation, head movement and such on the accuracy.

Therefore, it will be clear that these calculations in the spatial domain result in it being practically impossible to calculate the gaze direction on a mobile device from the difference between pupil position and eye corner positions.

Hence, the only realistic option to obtain the required gaze accuracy and resolution on a mobile device in a fully software solution which is with the use of information obtained from within the frequency domain calculations.

SUMMARY

Current interfaces and operating systems are designed around the use of keyboards and touch screens. However, using touch only allows for a narrow band of information of user commands passing from the user to the device, with slow and numerous actions being required by the users. In this connection, gaze would be a much faster and more intuitive interaction for users compared to touch.

By way of example, gaze control may allow for operating systems to adapt the flow of information to the user depending upon how fast the user can follow the on-screen information. The operating system will adjust the speed of information flow of what the user wishes to see based on the tracking of the gaze toward a screen where the information are flowed. This kind of gaze control may result in interfaces and operating systems showing data in a much clearer way with faster navigation being offered to a user.

Using gaze tracking control, the so called screen technology, wherein both the input and the output come through an interactive screen, can take a further step beyond, for example by only having high definition images when and where people are looking, resulting in less energy being consumed by the screen itself and in a more efficient control of the image output.

This feature may also be used to increase screen realism, e.g. by having a 3D cueing effect only where the viewer is looking at on the screen, in this way creating 3D effects without the need of using special glasses for 3D effects.

The gaze direction tracking can be used for the screen graphics, e.g. in gaming where a user playing a videogame can have a high definition image on a screen portion where the user is looking at, while around a speed blur effect is added for improving the game realism.

Another need to be accomplished is represented by knowing in real-time the effectiveness of mobile ads in real-world full mobility uses. Such algorithms will also allow for solutions such as pay-per-gaze instead of pay-per-click.

In addition, there is also a great need for new inexpensive solutions for disabled people.

For this next generation of operating systems and devices which use gaze tracking, software-only solutions would be highly preferred, so as to avoid the need to integrate e.g. infra-red projectors or an extra camera for stereo vision, with stereo vision being used to allow for higher accuracy.

Such devices can be, in a list having only an exemplary purpose, smartphones, tablets, wearable hardware such as interactive glasses, but also any other interactive objects in future homes and offices or public places. These devices can be involved in special uses such as interactive television, intelligent and interactive homes, automotive safety systems and so on.

It should be understood that the implementation of such technology is not limited to mobile devices, but it can be basically extended to any device or network connected device where re-programmable hardware is used with algorithms on them, and where video camera inputs can be added.

There is also a need for the gaze tracking solution to use as little processing power as possible. This is needed both for saving battery life as well as for real-time use in that it will need to run in the background and must not limit the processes running in the foreground. Considering that even forward-facing cameras in mobile phones now run at 30 fps and camera resolution is getting better as well, it means that the algorithms required need to be several orders better than the current state of the art. It is also not acceptable to count on the continued improvement of processing power, since battery power needs to be saved in any case and all applications, for example games, scale to use the maximum of processing power, therefore always leaving a minimal amount for algorithms such as standard image processing to run in the background.

To have the gaze tracking solution on many types of devices, algorithms should be embedded within the operating system or on processor itself. Algorithms need to be able to take advantage of multi-threading with parallel processors and to be able to use the GPU for part of the calculations. Apart from mobile environment, a software solution is requested in a form to be programmed on an FPGA or similar re-programmable hardware, on which there is not necessarily a last generation operating system.

The gaze tracking algorithms must not be seen as a separate entity from the hardware and electronics for which it is developed. Instead, the design and code should be specifically designed for hardware integration. Current state of the art algorithms were never intended for use on mobile devices with high definition cameras working at a high frame-rate.

Another reason justifying the need of fast algorithms for the gaze tracking is to account for a future developments race in computer vision, which will be to have increasing layers of algorithms with adaptation, learning and memory. Practically, all current computer vision methods are passive, with no reasoning. To have such added layers of adaptive algorithms, the only solution is for the base algorithms to be as fast as possible.

Therefore, apparently there is a need for a full mobility solution, a gaze tracking solution that can be used in everyday situations. A full mobility solution should also mean a minimal calibration requirement. It means allowing for changes in lighting, different types of faces, makeup, beards, glasses, hats, people with crossed eyes, and allowing for relatively high movement of the head relative to the mobile screen. This means avoiding the need for face recognition like many current methods. Current methods also often work worse for Asian eyes and if the user wears glasses.

Future camera technology developments with higher frame rates, better motion processing, better colour highlighting, better adaptation to contrasts and light changes and higher resolution will only increase the effectiveness of software solutions for gaze tracking. Note that all these camera technology updates will increase the industry need for efficient computer vision algorithms.

Current algorithms are often tested against the extensive FERET library of faces, which is the standard benchmark for face recognition algorithms. Such databases are limiting and even current video databases are limiting, since real world implies movements, blur, etc.

A technical problem in accordance with the present disclosure is to provide a gaze tracking method apt to satisfy the needs related to the above explained drawbacks recognizable in the state of the art, but accomplishing all the above technical expectations.

This problem is solved by a method for gaze tracking as above specified, comprising:

a. obtaining a digital video stream of a face through a camera, wherein eyes and/or pupils are recognized, to determine a position of said eyes and/or pupils, said eyes and/or pupils being then identified in corresponding boxes in a spatial domain, a content of the boxes being an input for further calculations;

b. transforming, by a processor, the content of the boxes into a frequency domain content;

c. applying to the frequency domain content of said boxes one or more sparse zones by a processor, covering together a fraction of a boxed frequency domain area, and a filtering kernel, at least partially overlapping said one or more sparse zones;

d. performing, by a processor, a multiplication between frequency data within each sparse zone and said kernel, combining the results in a single value; and e. repeating above steps (a) to (d) obtaining for each frame of said digital video stream said single value, wherein fluctuation of said single value is representative of gaze direction changes in time.

Further features of the method, leading to additional advantages, are defined in the dependent claims.

In a nutshell, the gaze tracking method according to embodiments of the present disclosure achieves high performances at the same time requiring both limited processor engagement and reduced power, so as to be particularly but not exclusively fit for mobile uses.

Therefore, according to the present disclosure, a method is described for operating a device, provided with at least a digital camera apt to produce a video stream and at least a processor, to obtain a gaze tracking when a face is captured in said video streaming, comprising:

identifying eyes or pupils and framing the eyes or pupils in corresponding boxes in a spatial domain, the size of the boxes being function of face position and orientation relative to said camera, and the content of the boxes being an input for further calculations;

transforming, by a processor, the content of the boxes into a frequency domain content;

applying to the frequency domain content of said boxes one or more sparse zones by a processor, covering together a fraction of a boxed frequency domain area, and a filtering kernel, at least partially overlapping said one or more sparse zones;

performing, by a processor, a multiplication between frequency data within each sparse zone and said kernel, combining the results in a single value for each sparse zone; and repeating above steps (a) to (d) obtaining for each frame of said digital video stream said single value, wherein fluctuation of said single value is representative of gaze direction changes along time.

Such method can therefore be applied to any kind having the above physical features, for many different purposes.

As stated above, there is a need for new methods for gaze tracking which do not require the use of extra hardware for infrared projection or stereo vision. These new methods also have to be fast enough to work in the background on the latest generation of mobile devices. Apart from use on the latest generation of mobile devices, in anticipation for future trends such as wearable hardware, the algorithms need to be able to work outside of the main personal computer operating systems and mobile operating systems and thus be programmable on processors and re-programmable hardware such as field-programmable gate arrays. The methods also need to be built up of algorithms, which can take advantage of the latest hardware developments on personal computers and mobile devices such as multi-cores and powerful graphical processing units (GPU's).

It is herein noted that the use of the information in the frequency domain naturally lends itself to respond to these needs for several reasons.

One reason is that in the frequency domain image processing every pixel in the image in the spatial domain contributes to each single value in the frequency domain. However, the frequency domain allows for much easier calculations as multiplications with filters, and other similar calculations with matrices are of the cell-by-cell kind, unlike the spatial domain, where each row of a matrix must be multiplied with all the columns of the matrix.

Working in the frequency domain also allows for the possibility of using sparse zones in the frequency domain, which can greatly accelerate calculations.

In addition, by working with sparse frequency zones, one can easily split the calculations into parallel parts to be processed with multi-threading on multiple processing cores.

Sparse zones, as well as the kernels operated as filters in the frequency domain, will be hereinafter explained and detailed.

Working fully in the frequency domain, without requiring the calculations to transform the image back to the spatial domain after the frequency domain transformation, also achieves a new flexibility in the choice of the mathematical computations that perform the transformation into the frequency domain. For example, the use of a kind of Görtzel algorithm becomes a realistic option.

The transformation of the images into the frequency domain also results in data, which inherently are more robust in contrast to light changes, movements, blurring and other effects affecting the gaze capturing.

The use of the frequency domain finally allows for a greater resolution and accuracy for gaze tracking, compared to methods based on object recognition techniques in the spatial domain.

BRIEF DESCRIPTION OF THE DRAWINGS

Further features and advantages of the present method will become more apparent by the following description of a preferred embodiment thereof, given by reference to the annexed drawings wherein:

FIGS. 2a and 2b jointly show a flow diagram representing the initialization of the gaze direction calculations in a method according to an embodiment of the present disclosure;

FIG. 11c shows the same logged data as FIG. 11a and FIG. 11b with the channels normalized at T=10 [sec];

DESCRIPTION

Figure 1:
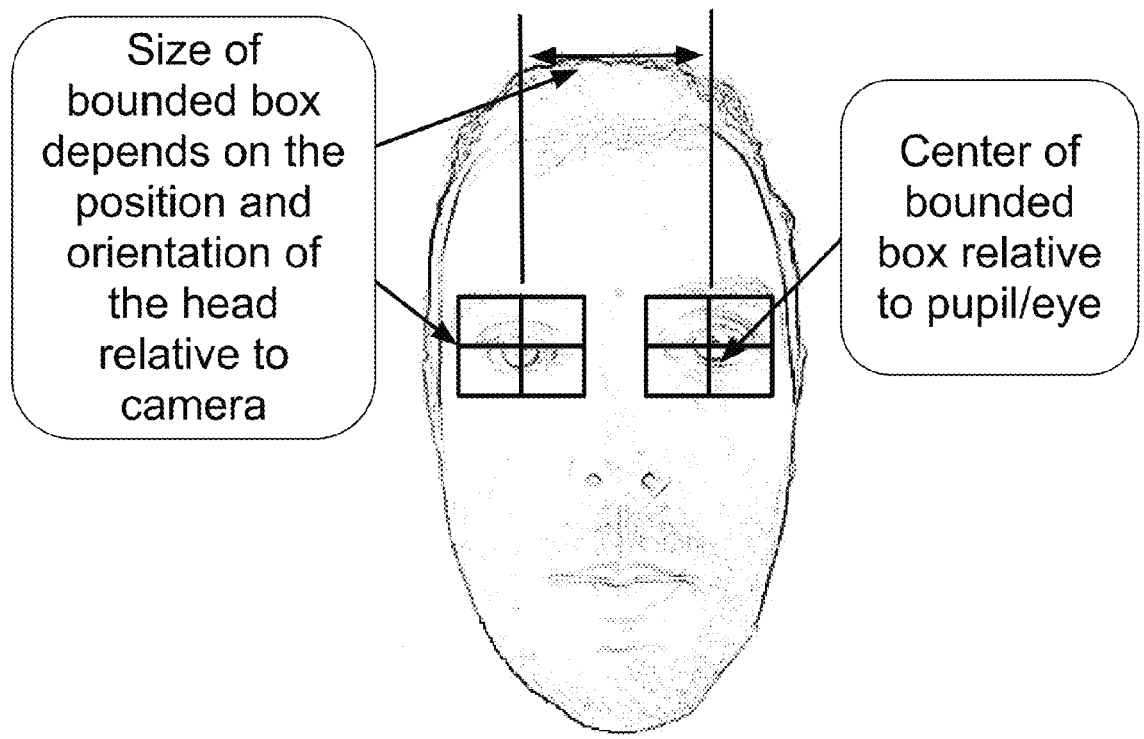
FIG. 1 shows a face image wherein pupils and eyes are boxed, the box size being a function of the head position and head orientation relative to the camera.

As stated above, in the frequency domain a much higher resolution of gaze direction is possible because the change of information in the frequency domain around the pupil is followed, not the pupil itself. In other words, by following information in the frequency domain, the changes in pupil position, eye white around the pupils, eye corners, eye lid position are all followed at the same time, and the combination of all these changes can be followed in a small sparse zone in the frequency domain.

The information in the frequency domain makes it much easier to capture such geometric characteristics of a spatial domain image.

Converting an image to the frequency domain is well established, being a discrete rather than continuous 2-dimensional Fourier transformation. The Fourier Transform is used in a wide range of applications, such as image analysis, image filtering, image reconstruction and image compression, text orientation finding and more.

The main transformation instrument could be the Discrete Fourier Transformation (DFT). Since the DFT requires a great number of calculation there are many other types which may be used to speed up the process. The Fast Fourier Transformations (FFT) is the most established of these, being an efficient algorithm to compute the discrete Fourier transform (DFT) and its inverse. However, there are a number of variations of the FFT. The FFT also has its limitations in image processing. For example, the sides of the image used in the input for the FFT need to have lengths in pixels which are a power of two, and the full FFT needs to be calculated before results for a certain frequency can be given. This places certain requirements on the memory, with the FFT. The FFT cannot be converted for sparse calculations and does not allow for easy implementation on re-programmable hardware and multi-core processors. Methods such as pruned Fast Fourier Transformations exist, but they require a great deal of complex coding for a minimal gain.

In the frequency domain of an image, each point represents a particular frequency contained in the spatial domain image.

The frequency spectrum is a plot of the energy against spatial frequencies, where spatial frequencies relate to the spatial relations of intensities in the image.

The Discrete Fourier Transformation (DFT) is the sampled Fourier Transform and therefore does not contain all frequencies forming an image, but only a set of samples, which is large enough to fully describe the spatial domain image. The number of frequencies corresponds to the number of pixels in the spatial domain image, i.e. the image, in the spatial and Fourier frequency domain, has the same size.

The Fourier Transform produces a complex number valued output image, which can be displayed with two images, either with the real and imaginary part or with magnitude and phase. In image processing, often only the magnitude (real) of the Fourier Transform is displayed, as it contains most of the information of the geometric structure of the spatial domain image. However, to re-transform the Fourier image into the correct spatial domain after some processing in the frequency domain, one must re-use both magnitude and phase of the Fourier image.

In the spatial domain, the values are usually the light intensity of the grey scale pixels, which may range from 0 to 255. The Fourier domain image values have a much greater range than the image in the spatial domain. Hence, to be sufficiently accurate, the values in the frequency domain are usually calculated and stored as float values.

By using the information in the frequency domain, without the need to return to the spatial domain to obtain the final gaze output, there are several advantages. Firstly, the lack of an extra step speeds up the calculations. Secondly, since the frequency domain values need not be converted back to a correct spatial domain image, sparse zones can be used. These sparse zones by themselves do not necessarily contain enough frequency domain information to recreate the spatial image. But they do contain enough information for image classification and gaze direction information. Thirdly, because it is not required to convert the image back to the spatial domain, it opens the possibility to use other methods besides DFT or FFT to convert the image into the spatial domain. This is because it is not necessary to have the full real and imaginary information in the frequency domain, but for the sparse gaze calculations the magnitude is enough. This opens the possibility to use methods, such as a two dimensional version of the Görtzel algorithm, which can be set up sparse, which are more flexible for use on re-programmable processors and more flexible for parallel use on multiple processor cores.

Here and in the following description, a sparse zone is meant to be one or a group of zones, i.e. one or more, covering a fraction of a frequency domain. Each zone should be seen as a frequency interval, possibly defined through intervals on the axis of abscissae and of the ordinates (see FIG. 5) if the sparse zone is squared or rectangular, but a zone of many other shapes may be used, i.e. defined by a closed line in the frequency domain.

The assembly of the sparse zones covers a part, i.e. a fraction of the overall frequency domain resulting from the transformation of the spatial domain. Each of the sparse zone encircles frequency data transferred from the spatial domain.

Conveniently, the sparse zones may be grouped together, either possibly partially overlapping each other or placed side-to-side, to increase the local resolution. Calculations on frequency values derived from said sparse zone are indicated as sparse calculations.

In the methods for gaze recognition herein described, a first step is provided of obtaining a digital video stream of a face through a camera, wherein eyes or pupils are identified in corresponding boxes, divided in pixels in the spatial domain.

Figure 17:
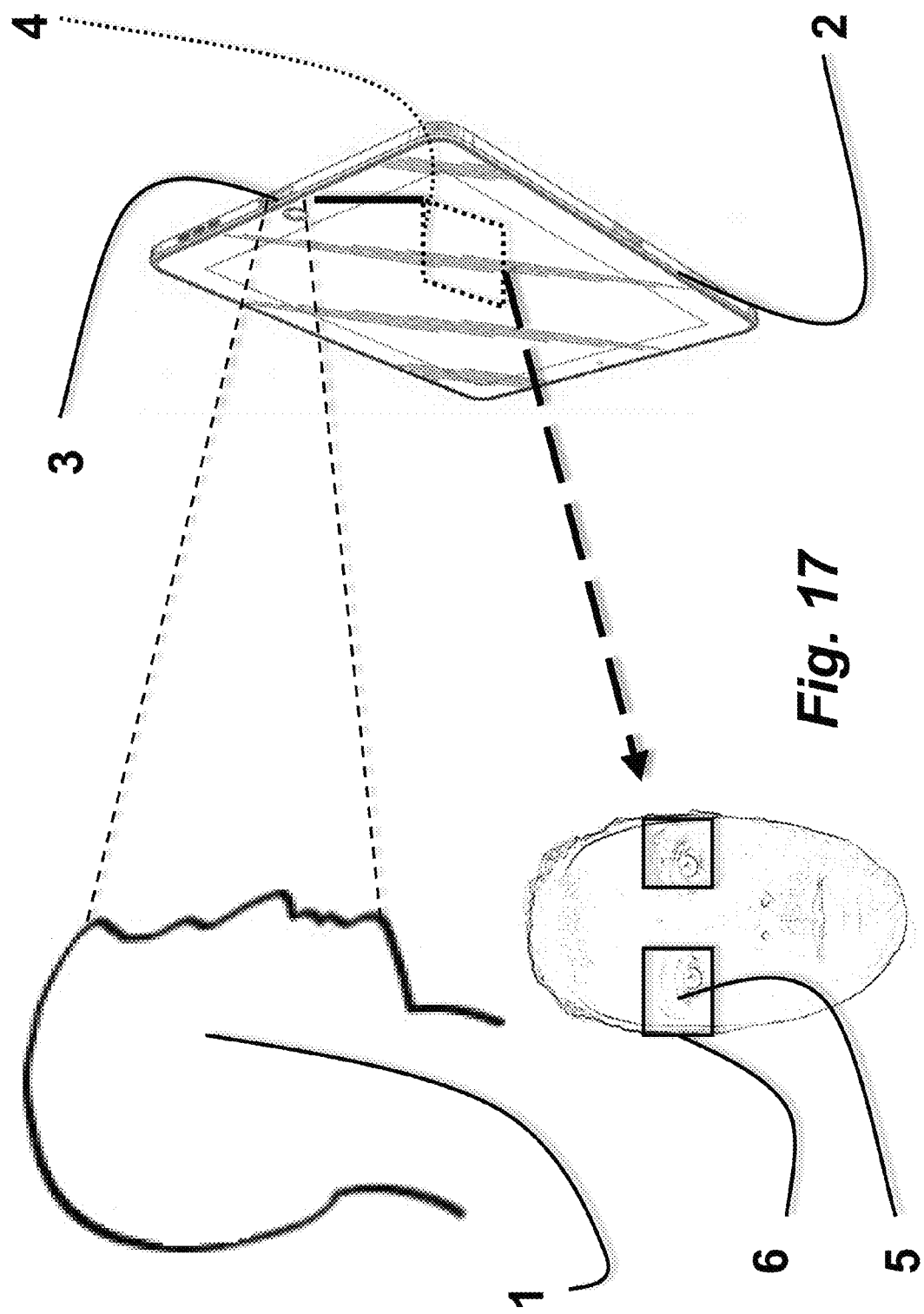
FIG. 17 depicts a device carrying out a gaze tracking according to an embodiment of the present disclosure.

A gaze tracking process is schematically depicted in FIG. 17. A user handles an electronic device 2, e.g. a tablet, provided with a front camera 3 and with a processor 4, in particular a microprocessor receiving a video data stream from said camera.

Hence, a user's head is framed by the camera, and digital video stream of a head face is obtained therefrom. In this connection, through said processor 4, eyes 5 and/or pupils are recognized, to determine a position of said eyes and/or pupils, said eyes and/or pupils being then identified in corresponding boxes 5 in a spatial domain, a content of the boxes being an input for further calculations; then, such content of the boxes 6 is transformed by a processor into a frequency domain content.

The size of each box is determined in function of the face position and orientation relative to said camera, the content of said boxes being the input for the further calculations.

Generally speaking, such camera is possibly part of any device intended to carry out this method, including a microprocessor for performing the requested calculations and possibly a screen, preferably a touch-sensitive screen, referred as a touchscreen.

FIG. 1 shows how bounded boxes are chosen relative to the pupils or eyes in a face image resulting from a digital video stream.

The bounded box size and position are also a function of the type of eyes and conditions of light, because the bounded box is the input for the gaze tracking formulas, and the formulas in turn are a function of head position, head orientation, eye type and light conditions.

According to FIG. 1, it is shown how gaze tracking calculations depend on the recognition of the position of the pupils and eyes. Based on this recognition, a bounded box, in particular its size and shape, is defined around the eyes. This can be done using the known recognition steps of either the eyes or pupils or a combination of both. The image defined by the contents of this bounded box is the input for the calculations.

Approximately, the bounded boxes are centred relative to the respective pupils.

There are numerous methods, which can be used to recognize pupils and eyes on the screen, e.g. Viola-Jones or means of gradient methods.

During the gaze calculations, the recognition of the positions of the pair eyes and the pupils need to be constantly followed. Obtaining these positions will give the relative position of the user to the camera using the position of the pupils and relative distance between the pupils. Also, an estimate can be made of the rotation of the head relative to the camera. With the recognition of the orientation of the head relative to the camera, the sideways angle and tilt of the head can also be estimated relative to the camera.

The above will increase the movement allowed to the user relative to the camera while using gaze tracking, but it only slightly affects the accuracy of the gaze calculations of the eye movements for a given head position and head orientation relative to the camera.

Figure 2B:
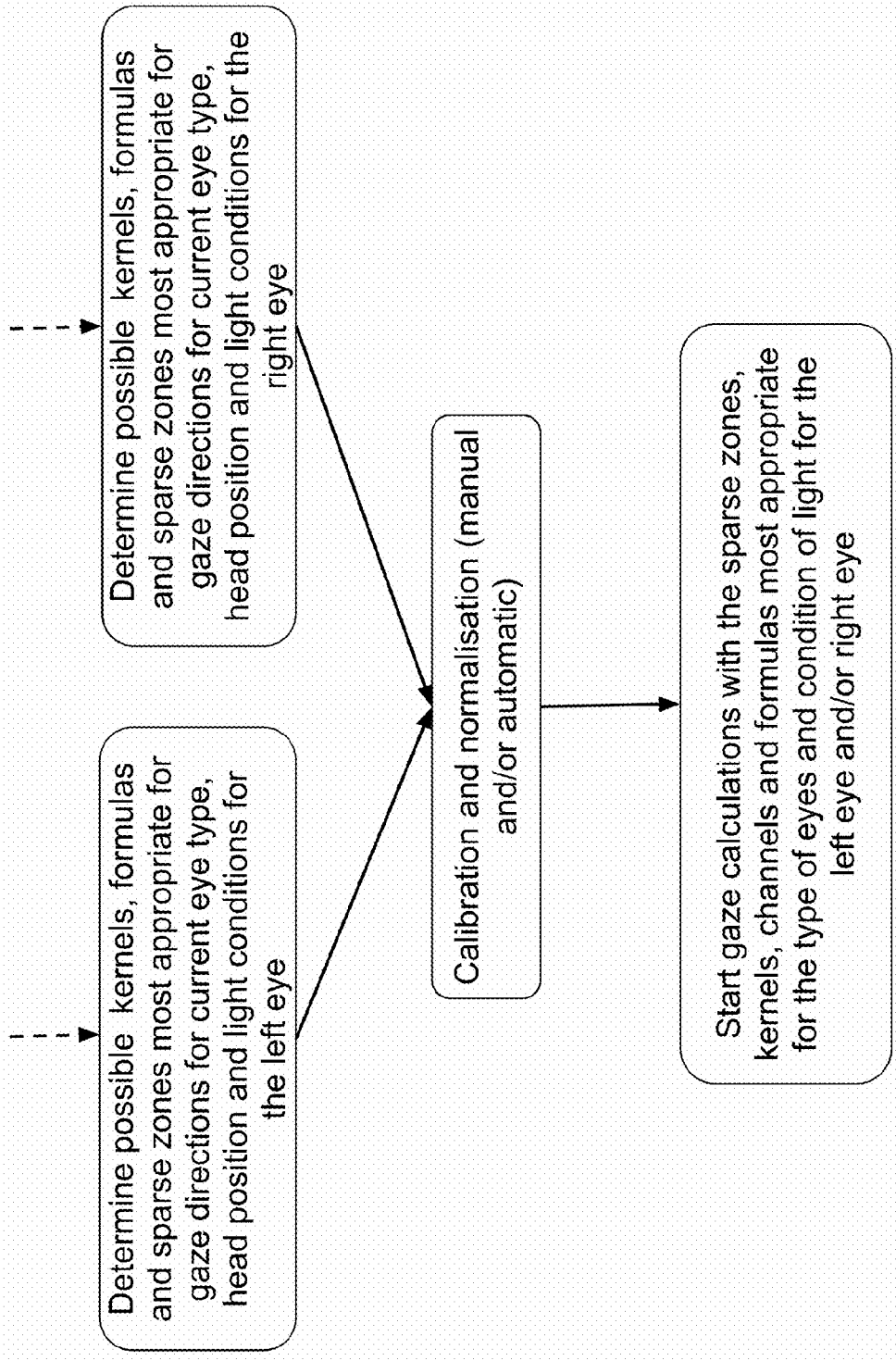

According to FIGS. 2a and 2b, it is shown how the gaze direction calculations initialize by said processor.

From a digital video stream, composed with a continuous flow of image frames, taken from a camera of a device wherein the present method is carried out, first the positions of the pupils and eyes are determined. Then, an initial estimation of the position of the head relative to the camera and head orientation can be done. One can use the pupil and eye position information for this.

It is also possible to add extra information based on the recognition of extra facial features to obtain added head inclination and rotation information. For use of gaze tracking on mobile phones it can also suffice to leave out this extra head orientation information since users often tend to limit head orientation movements relative to the phone to small angles.

Next, the bounded boxes, which capture the eye images, are defined (see FIG. 1). Here the key step is to have the input image as consistent as possible for the gaze calculations. This means consistency in both the centring as well as the dimensions of the bounded boxes.

In the next step, a known classifier is used to classify the type of light conditions and type of eyes of the user for each eye, within each bounded boxes. A good classification of these, combined with the head orientation, allows for specific gaze calculations to be used for the classified conditions, with higher accuracy and more sparse frequency zones.

The calculations are not necessarily the same for each eye as there can be unequal light conditions on the users face, left and right eyes reacting differently to light changes, a different point of view for each eye with head orientation, and the left and right eyes being not exactly the same shape.

It is also possible to use only one of the eyes for the gaze calculations, however it will result in less robustness and less refinement in the gaze calculations.

In this step, a real-time re-training of the classifiers can possibly be done, so as to improve the classification accuracy and personalize the gaze calculations for the user.

This real-time classifier can also be used to ensure the stability and consistency of the bounded boxes around the eyes.

In the next step, the gaze direction is calibrated. This step can be a direct calibration of gain and offset, or a calibration, which also normalizes all the channels used for the gaze calculations or other known methods for calibration, the calibration being performed normalizing the single values at a certain time. The calibration can also be saved, by combining a real-time training of the classifiers for the eyes of the user with saved calibrations for the conditions.

In this way, a user can be recognized by classifiers, and his head position, light and head orientation can be linked with earlier or known calibration, avoiding the need to re-calibrate.

The calibration phase is also used for a further selection of the most appropriate gaze direction formulas. This can be done by having several pre-defined formulas and determining during calibration which of these has the best signal-to-noise ratio.

The calibration phase can also be used to determine if there are unwanted interactions between the gaze calculations for the different directions. For example and upside-down gaze movement might also slightly be captured by the sparse zone and kernel used for the left-right movements. These effects can be captured during calibration and the correction factor for this can be determined.

Kernel is meant to be any kind of filter in frequency domain, to be applied to the sparse zones as defined above.

Such filter can be an edge detection linear filter, a Gabor filter (mixed Gaussian and Sinusoid), a Gaussian filter, an intensity enhancing filter, a lowpass filter, a Sobel edge detection filter, another edge operator like Canny, Canny-Deriche, Differential Sobel, Prewitt, Roberts, Cross, a corner detection operator like Harris operator, Shi and Tomasi, Level curve curvature, SUSAN, FAST and many others.

In the following, a Gabor filter will be adopted, by way of example.

At this point, the gaze calculation have been initialized, since the head position and orientation are known states, as well as the pupil and eye position, the bounded boxes which capture the eye regions have been defined, the eye type has been classified, the light conditions have been classified and the calibration has been done. The gaze calculations can now start.

In practical terms, there are constant inputs of images of the eye zones for the calculations, and that kernels and sparse zones most appropriate for the gaze direction for each eye have been determined.

Figure 3A:
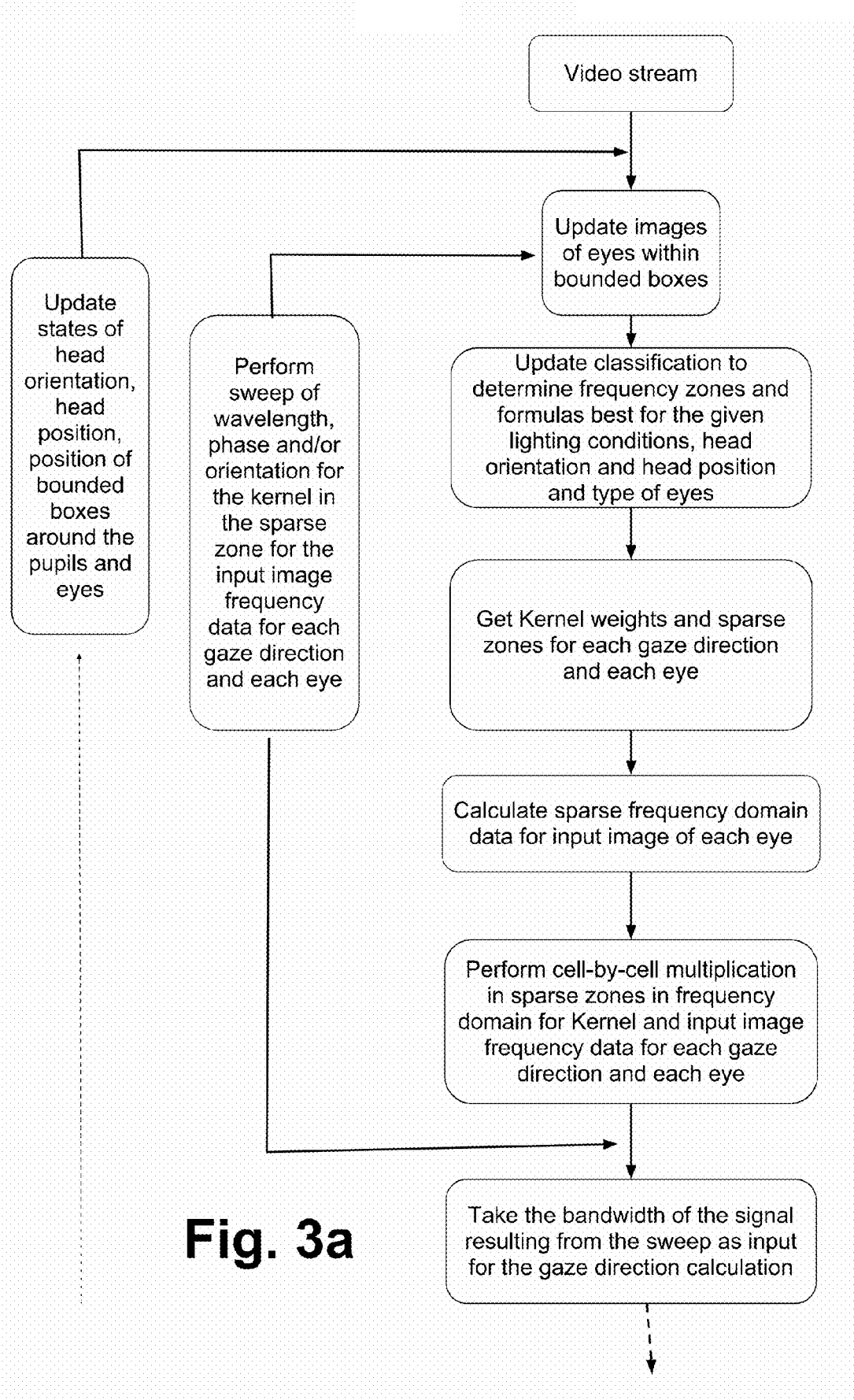
FIGS. 3a and 3b jointly show a flow diagram representing the process to obtain gaze calculations after the initialization of FIG. 2, with the gaze calculations working in real time.
Figure 3B:
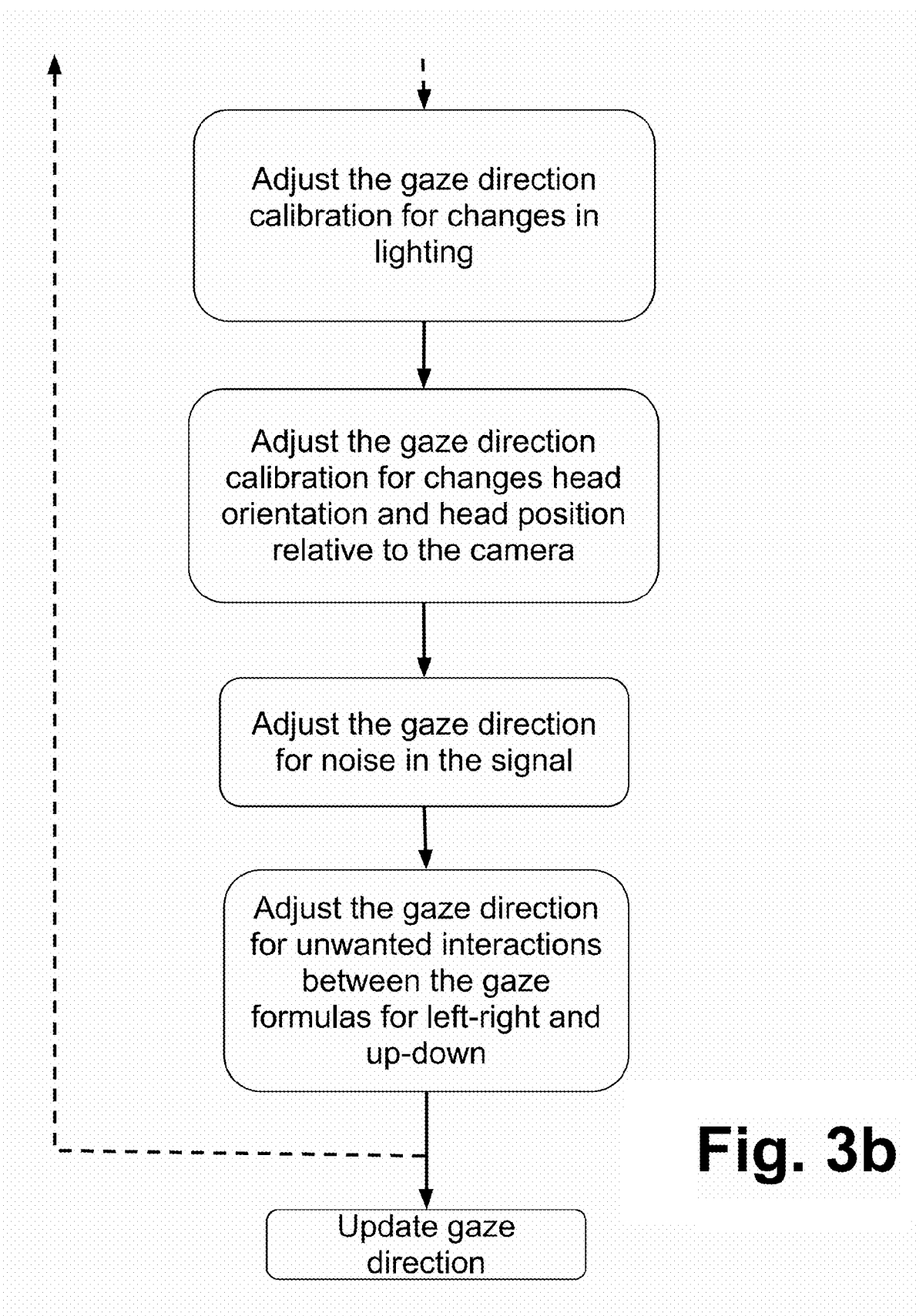

According to FIGS. 3a and 3b, it is shown how the calculations proceed in real-time after the initialization described in FIGS. 2a and 2b.

Firstly, the states defining the bounded boxes around the eyes, the head position relative to the camera and the head orientation relative to the camera are updated by the processor after the end of the last gaze calculation cycle from the video stream.

This creates, using the input stream of video, updated images of the eyes within the bounded boxes. These input images of the eye regions are used as inputs for the calculations.

In the next step the states, given by classifiers, defining the type of eyes and type of lighting for the given head orientation and head position are updated.

This step then determines the sparse zones and kernels to be used for each gaze direction and each eye. It is likely that the same kernel of the last gaze calculation step will be used. However, in case of large changes about lighting, orientation or zoom, the classifiers can determine that an update of the kernels is required. The states, which define these classified conditions, are then also updated accordingly.

Next, the input images, i.e. the content of said bounded boxes for each eye, are transferred by the processor into the frequency domain, for each eye. Many commonly used transfer methods can be used for this, such as the Discrete Fourier Transformation or variations of the Fast Fourier Transformation. The Fast Fourier Transformation can do this transformation relatively fast, but it requires the sizes of the input image to be a length that is a power of two. Also, it cannot be make sparse, requires all the calculations for each frequency to be performed and all the steps of the transformation in memory before the calculations for the frequencies can start and also it is not easily adapted for flexible use on re-programmable hardware and with multi-threading on multiple parallel cores.

Discrete Fourier Transformations can be make sparse, but are computationally very heavy.

Since it is not necessary to transform the calculations back to the spatial domain after the frequency domain calculations, new alternatives become possible, such as a use in 2D of the Görtzel algorithms, which can be made fully sparse, can be even faster than the FFT, hardly uses any memory at all and easily can be coded for use on re-programmable hardware and multi-threading on multiple cores.

Now, within the defined sparse zones, frequency data multiplications are performed between the image data in the frequency domain and the kernel. It will be clear to the man skilled in the art of frequency domain calculations that the gain in calculation speed it proportional to the size of the sparse zone relative to the complete zones and that for a small sparse zone the speed gain can be very high.

For example, if the input image is 64*64 and only a 4*3 sparse zone is required, then the cell-by-cell multiplications will be performed more than 300 times faster than for the full calculations. This allows for multiple gaze directions to be performed for the same sparse zone without a noticeable impact on the processor use.

Here, cell is intended to be the frequency value of the sparse zone resulting from the corresponding spatial domain through said transformation.

Note that the kernels most likely already been created in advance in an offline optimization phase and this gain in processing speed of only performing the necessary cell-by-cell multiplications in the frequency domain can also be obtained when using a full FFT.

Note also that there is the option of already having the kernel for each setting in the form of real and imaginary weights in the matrix the size of the image input. Alternatively, the kernel can be in purely mathematical form, the matrix of real and imaginary weights being created when required. The latter uses less memory and allows for more flexibility but requires an extra processing step.

In case of a kernel created by an offline optimization, it is possible that there is no mathematical representation and the kernel must then be stored in memory in matrix-form to be used when required.

For each eye and each gaze direction there will be a different and appropriated kernel according to the classified conditions, to achieve the best possible compromise between resolution and detection precision on the basis of the signal-to-noise ratio, so as to avoid detection of involuntary eye movements but precisely determining the voluntary eye movements.

A second processing speed gain can be obtained by using other methods, such as a 2D version of the Görtzel algorithm instead of FFT for transforming images to the frequency domain. Note that the gain here is not just in processing speed but especially programming flexibility and memory use.

Since the calculations are so fast, they can be performed multiple times. As will be described later, by performing a sweep of the kernel parameters such as orientation, phase and wavelength, more robust gaze direction results can be obtained.

These calculations are performed for each eye and each gaze directions. It is also possible to perform the calculations only for one eye instead of both eyes. It is also possible to perform the calculations with only a single kernel for each eye and each direction, depending on the classified conditions, without using a sweep of kernel parameters.

However, it will be clear to those experienced in such calculations that along with such sparse calculations there is a minimal cost for calculating the results for both eyes and also performing a sweep of kernel parameters, so as to test different kernels before determining the best one.

For each eye and gaze direction there is now a sparse zone with results for each frequency in the sparse zone resulting from the cell-by-cell multiplications. These results can now be combined into a single value, for example by taking the sum of values within the sparse zone. This gives a single value.

In case of a single channel being used for each eye, there will be a single value for each gaze direction for each eye. Since the calculations are repeated by the processor for each frame of the video input, this results in a vector of values that change frame by frame.

In case of a sweep of kernel parameters, there will be an array of values for each eye, i.e. for each gaze direction, which are processed further. This is done by taking the band of the sweep, for example the maximum value resulting from the sweep minus the minimum value resulting from the sweep. This results in the reduction of the results into a single number as the value to be used as input for the gaze calculation. It is possible to using a single kernel, without a sweep for the gaze calculations. However, the use of the results resulting from of such sweep will be inherently more robust to small changes in light conditions and other such effects.

Here, kernel sweeping is meant to be a variations in kernel parameters apt to identify which kernel definition gives the best result, as it will be apparent from the following examples.

With reference to FIGS. 2a and 2b it has been described how the calibration parameters are initialized. This calibration defines the transformation of the calculated gaze parameters, combined with the head position and the rotation thereof relative to the camera.

With the update states for the head position, head orientation, light conditions and eye type, the calibration can also be updated and thus the gaze direction accuracy improved without requiring a new calibration by the user.

Also at this point, noise in the gaze signal can be corrected for unwanted noise in the signal, such as spikes.

From the gaze calculation initialization described in FIGS. 2a and 2b, resulted also the recognition of any unwanted interaction effect between the gaze directions. If this is the case, the correction factors to clean the gaze direction for these effects were also determined. These correction factors can now also be implemented if required to further correct the gaze direction signal.

Figure 4A:
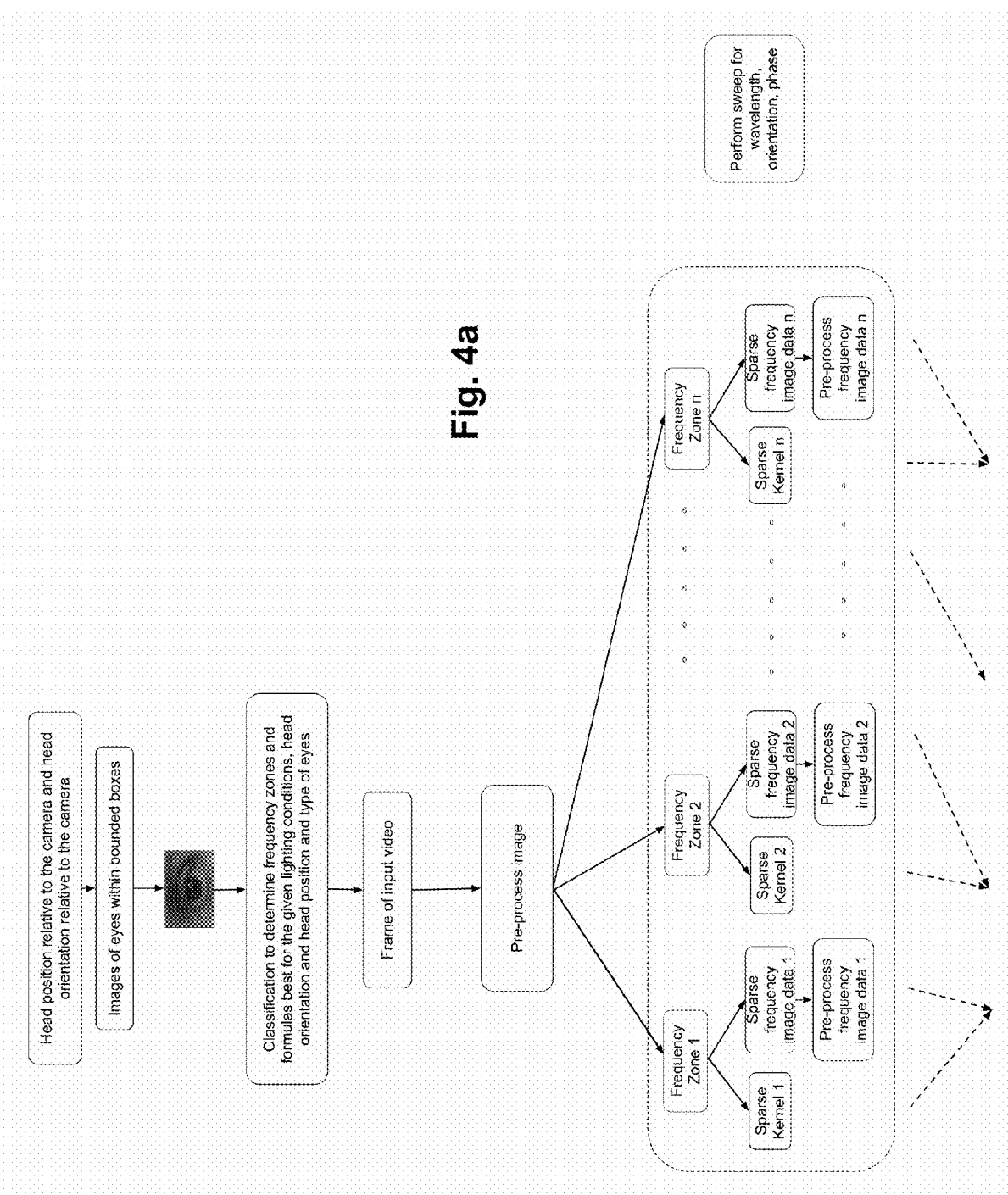
FIGS. 4a and 4b jointly show a flow diagram representing sparse gaze calculations in a method according to an embodiment of the present disclosure.
Figure 4B:
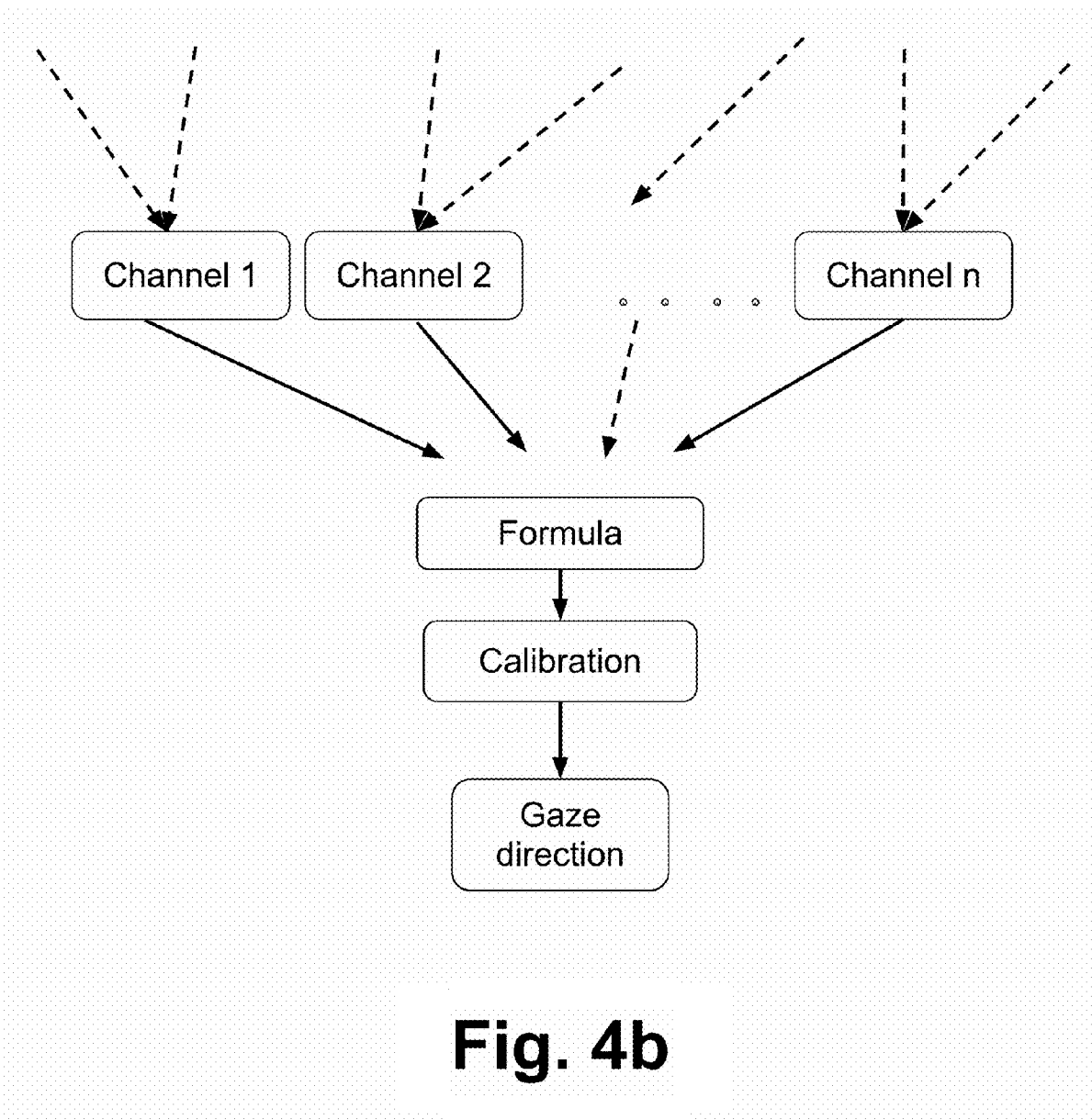

In FIGS. 4a and 4b the outlines of the sparse calculations are shown once again for the processing of a single frame of video input for one eye and one gaze direction, for the case of using a sweep of kernel parameters.

It will be clear to the man skilled in the art that the same outline can also be used for gaze calculations using both eyes.

First, the head position and orientation relative to the camera are determined. Then the images of the eye regions are captured. This image is then classified for the type of light and the type of eyes to determine the most appropriate formulas for gaze direction given the conditions.

Before the start of the frequency domain calculations there is the option to pre-process the frame of video input already, for example by equalizing the average light intensity of the pixels in the frame.

With the given sparse frequency zones and kernel, it is possible to appreciate how a number of calculations are done in parallel. Note that in this outline, a formula for a gaze direction for a single eye is built up of a number of channels. Each channel is created within a sparse zone by cell-by-cell multiplication between the input image transformed into frequency domain and the kernel. Note also that there is a possible extra pre-processing step on the input image, i.e. a lowpass filter or edge detection or other. Being in the frequency domain, such multiplications are fast. Such an extra filter step can allow for example for less interactions between the left-right and up-down gaze directions channels.

All the channels resulting from the sweep together are then combined into a formula channel. Using the values saved from the calibration, then they are transformed into a direction channel for gaze.

Figure 5:
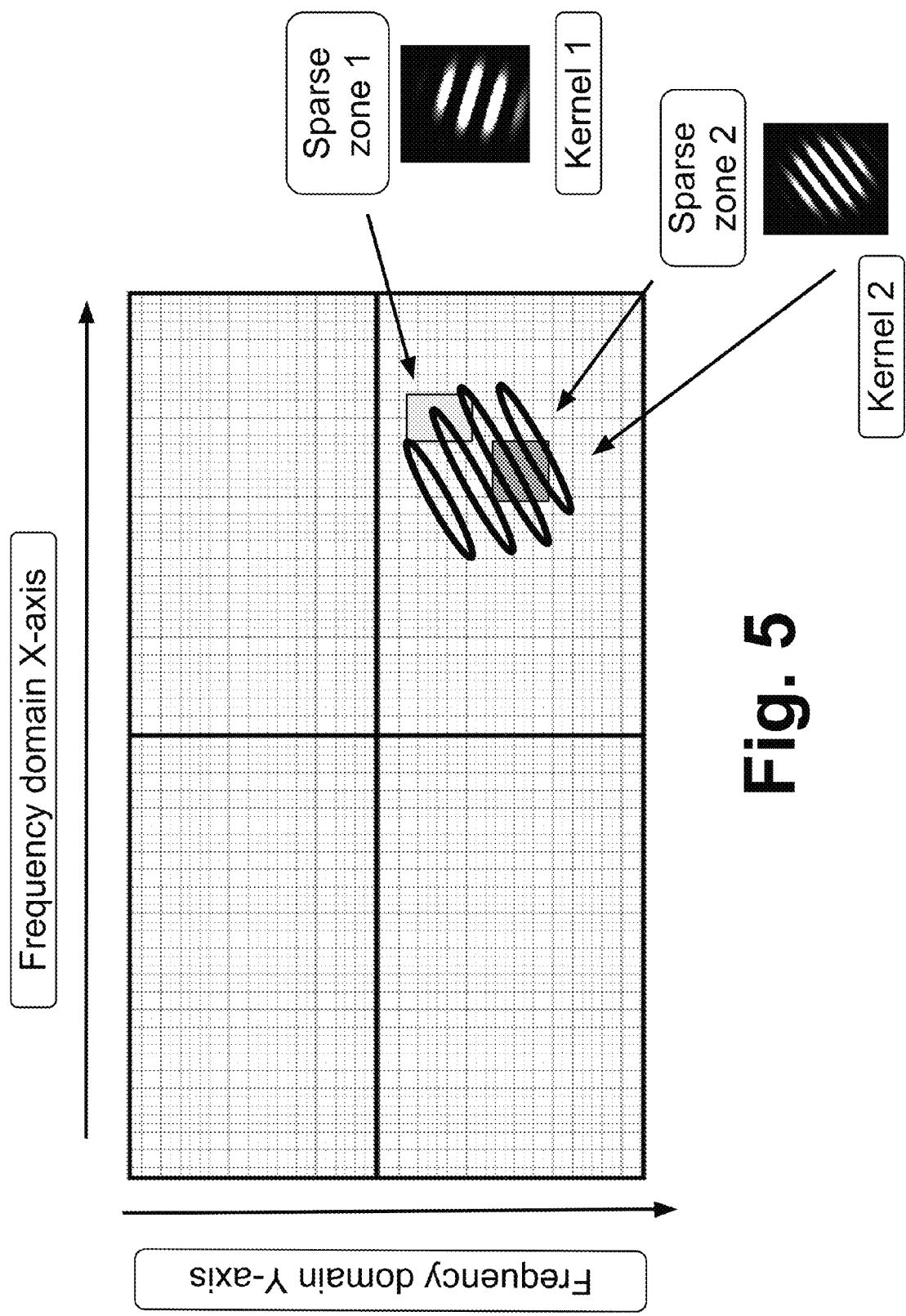
FIG. 5 shows a grid representing all the frequency domain data of an input image of the bounded box of FIG. 1, where the small rectangles are examples illustrating chosen sparse zones.

FIG. 5 is an example of how the sparse zones can be combined with kernels. Two different zones are shown, they may be provided either for different gaze directions, different eye types of different light conditions or other classified differences that result in different formulas being used for gaze directions. In the example, the sparse zones are rectangular, however a defined sparse zone can be of any shape and need not even be of connected frequency points.

The entire grid represents the whole frequency domain for the image used as input for the calculations, i.e. the eye captured by the bounded box. When using the FFT transformations, the sides of this grid need to be a power of two. When using DFT or a 2D version of the Görtzel algorithm, the grid can be of any size, which naturally gives much more engineering flexibility in the refinement of the gaze tracking solution.

Above the sparse zone, a contour of a kernel can be seen. This can be an algorithm such as a Gabor filter, which is a combination of Gaussian and sinusoid filters, but it need not to necessarily be a Gabor filter. Any filter can be designed for this purpose, and the kernel can have a weight resulting from an offline optimization, without the possibility to describe this kernel in mathematical form in the frequency domain.

Those experienced with calculations in the frequency domain will appreciate again the gain in processing speed, when only the cell-by-cell multiplications are done, it is proportional to the percentage represented by the sparse zone relative to the total frequency domain. In FIG. 5 the shown sparse zones are in fact quite large, for the sake of the understanding of the figure.

FIG. 6 again shows a grid representing all the frequency domain data of an input image of the bounded box. It shows a single sparse zone for which a sweep of kernel parameters is performed. The figure illustrates how kernel might overlap the sparse zones in the frequency domain. It will be clear that this figure is purely given for descriptive purposes and that the actual overlap can be very different depending on the chosen sparse zones and chosen kernel as well.

In this example, the kernel only partially overlaps the chosen sparse zone. There can also be a variation in the input image, creating a slight variance in what is captured of data of the images by the sparse zone. Considering that, in the frequency domain, the multiplication between the input image transformed into frequency domain and the kernel is cell-by-cell, within the sparse frequency zones, it will be clear that there is a variation in the relative way the kernel and data in the sparse zones overlap.

Figure 6:
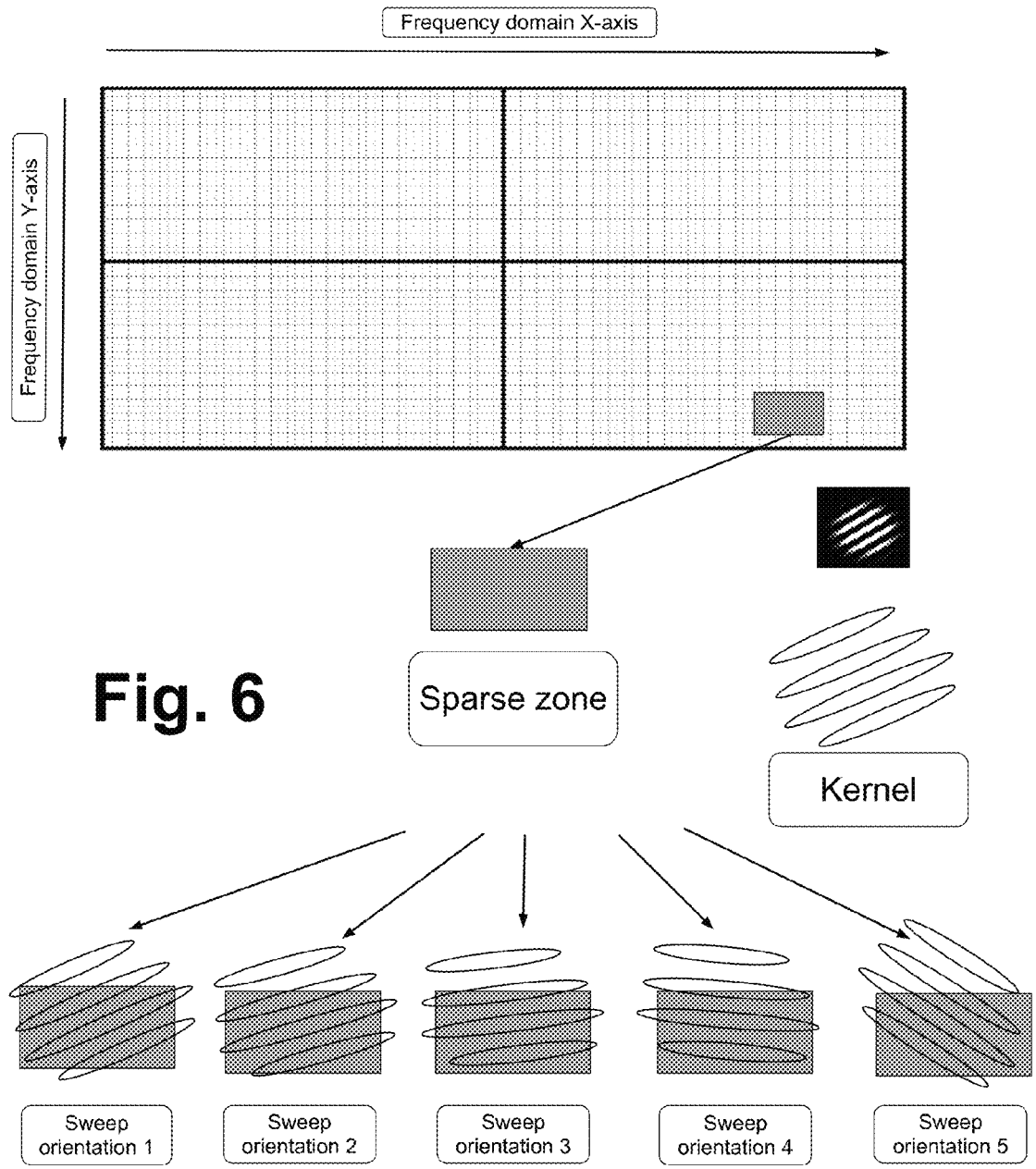
FIG. 6 shows a grid representing all the frequency domain data of an input image of the bounded box of FIG. 1, and examples illustrating chosen sparse zones.

As previously said, a method for overcoming this effect consists in having a sweep of the kernel parameters. For example, these parameters can be phase, orientation and wavelength, depending on the kernel formula. In FIG. 6 an example of shifting the phase of the kernel is seen, with the kernel being a Gabor filter, wherein the frequency domain results in a translation of the peaks of the Gabor kernel parameters. By taking such sweep, part of the variability in results has already been removed because it became more likely that the correct used phase highlights the chosen movement.

It is also possible to choose to shift the frequency zones themselves instead of the kernel on top of the sparse zones. However, it will be clear that such shifts can have much less resolution and refinement than shifting the parameters of the kernels, since the sparse zone must move in discrete steps.

Figure 7:
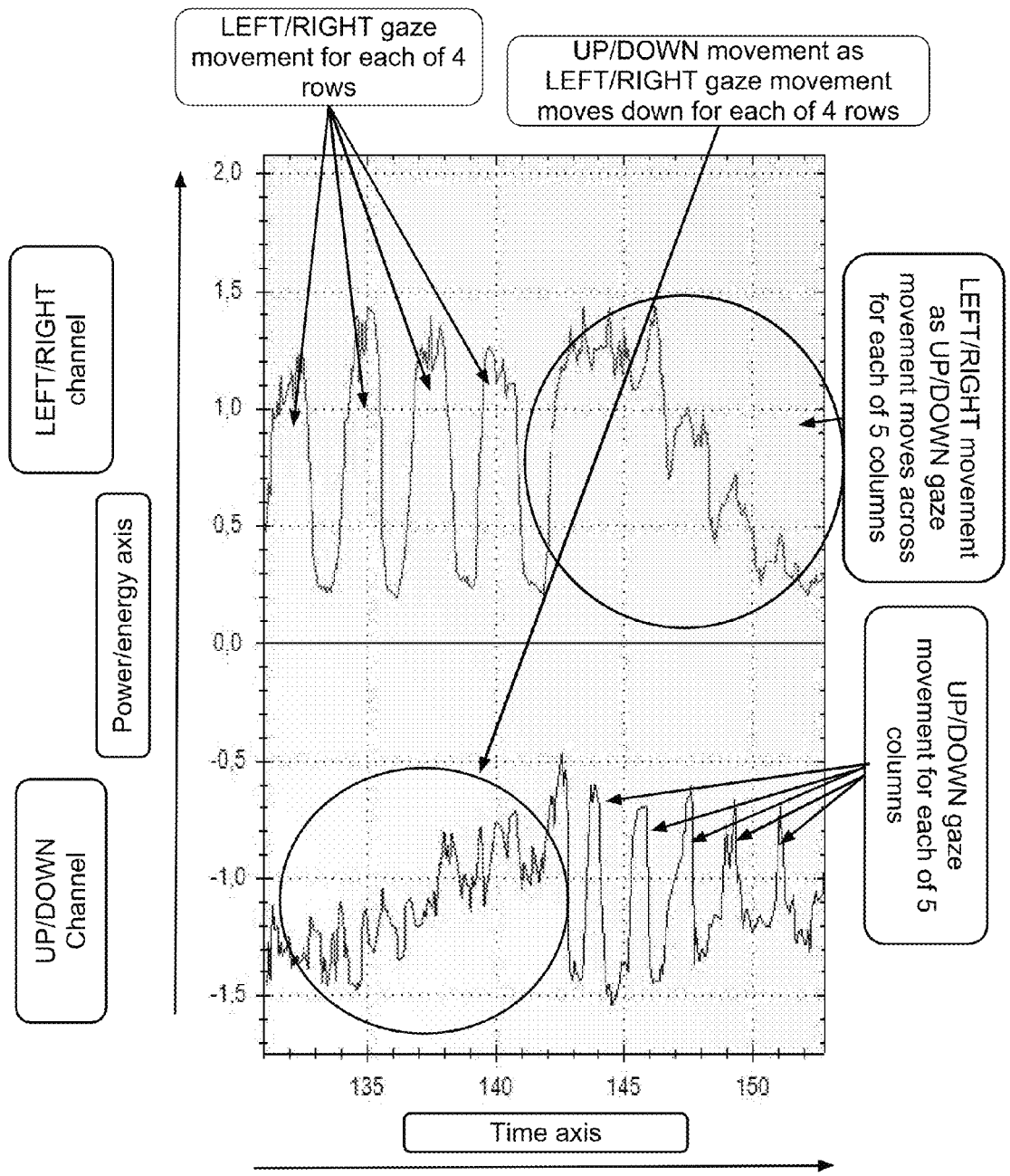
FIG. 7 shows an example of telemetry output, done with a smartphone in landscape mode with the screen being divided in 4 rows and 5 columns.

FIG. 7 shows an example of telemetry output, which is achieved by a smartphone in landscape mode and its screen being divided in 4 rows and 5 columns, possibly corresponding to 4×5=20 icons on the screen. In such case, the purpose of the gaze tracking could be the selection of an icon by user's eye movement.

Two distinct channels are therefore provided: one for the right-lest movement and one for the upside-down movement.

On the top portion, the telemetry for a channel that captures left-right movement is represented, while on the bottom portion the channel capturing up-down movement is visible.

In the diagram of FIG. 7, the X-axis (abscissae) is the time T axis, while the Y-axis (ordinates) is the power in the frequency domain resulting from the calculation. The separate results of the channels have been offset in the y-axis to add clarity to the figure. In this way, the gaze pointing may be directly represented on the phone screen, and operated as a gaze pointer.

In the left half of the telemetry, it appears that the user is first looking row by row, starting from the left and moving his gaze to the right and back to the left, for each row, repeating this action from the top row down. This can be seen in the left-right channel on the top by four different peaks, while at the same time in the up-down channels below the row-by-row gaze is registers the changes in row height.

In the second half of the telemetry, the user is looking at the screen column by column. The user starts at the top and looks down and then up again. Starting from the left of the screen this is then repeated for the 5 columns. This can be seen in the up-down telemetry as five distinct peaks, while at the same time the left-right channel captures the left-right movement as the user moves across column by column.

In this figure, single channels are used. It can be seen that while the channels can be easily calibrated to gaze movement on the screen with a gain and an offset, the channels will not be robust to light changes as the power, the y axis, is directly linked to the intensity of light in the image.

It is possible to directly use such channels for the gaze direction. However, they will be less robust to light changes and other variations and noise factors such as zoom, movement and such.

Figure 8:
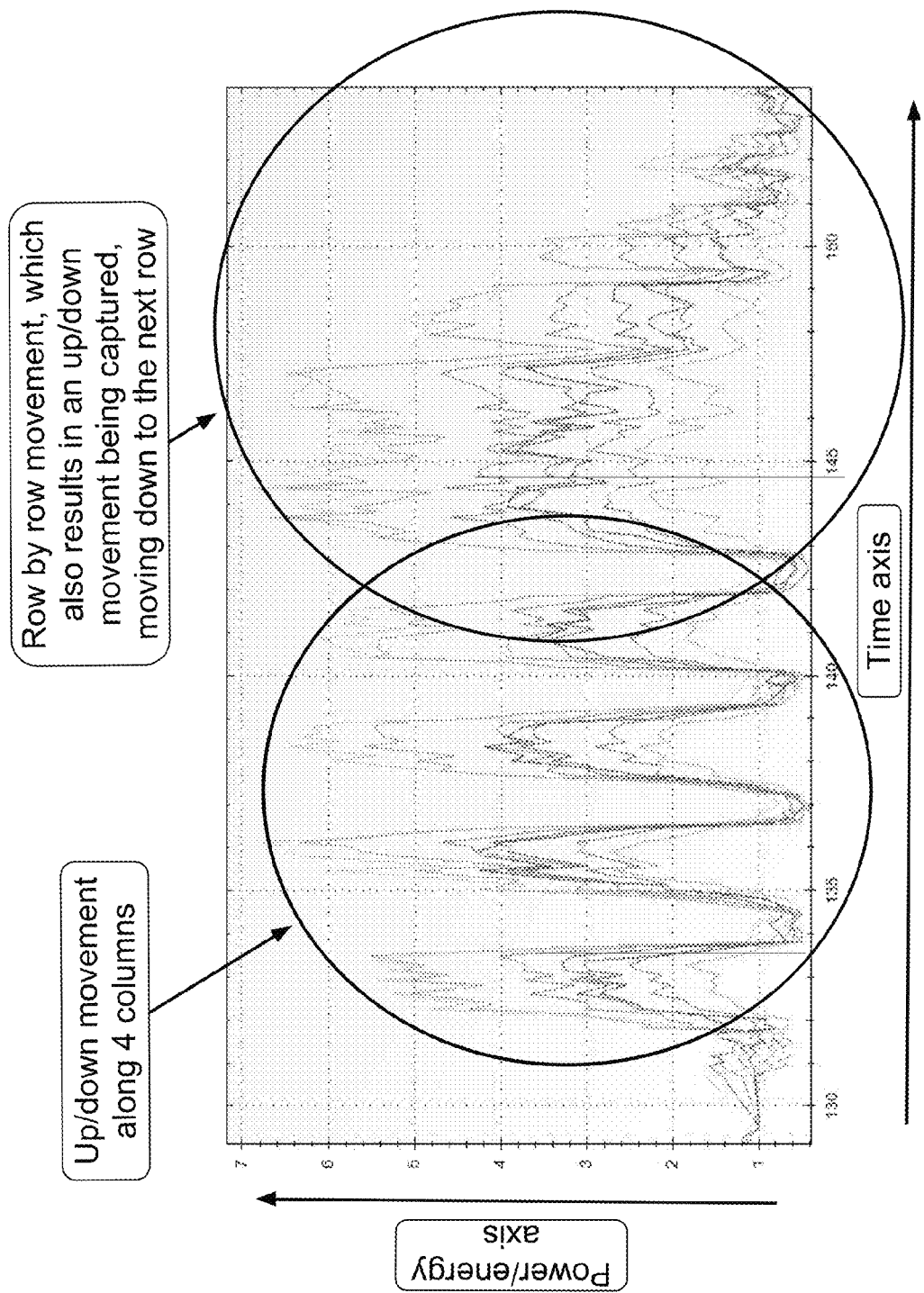
FIG. 8 shows one channel represented in FIG. 7.

In FIG. 8, the same type of gaze movement is done by the user as shown in FIG. 7. For the sake of simplicity, only one of the channels of FIG. 7 is shown. However, now a sweep of parameters of the kernel is done for the channel. A combination of wavelength, phase and orientation changes can be used as a sweep. It is possible to see how each step in the sweep gives slightly different results for the multiplication between kernel and image in the frequency domain.

Note that such sweeps are different than those commonly used for example for Gabor banks. In a Gabor bank, typically used for extracting features for object recognition, the parameters are varied as widely as possible to get a widest capturing of features, which can help in recognizing a face or other object chosen for recognition.

In contrast, the sweeps used in this implementation seek to remain narrow, so as to capture with more refinement a gaze movement. In practical terms, a Gabor bank is likely to use a sweep of orientation with values of 0, 45, 90, 135, 180, 225, 270 and 315 degrees, while a sweep to capture a gaze movement might use 1, 2, 3, 4, 5, 6, 7, 8 degrees as input orientations for the sweep.

Summarizing, as the method uses sparse zone, i.e. few zones covering only a fraction of the whole frequency domain field, in the kernel sweeping it uses only few different variations of the same filter. Both said kinds of variations aim to optimize the detection of the gaze movement, performing the lowest quantity of computations requested for this task, i.e. interrupting the different zone analysis and the kernel sweeping as well when the noise signature of the obtained telemetry indicates that the movement is detectable as precisely as requested.

Figure 9:
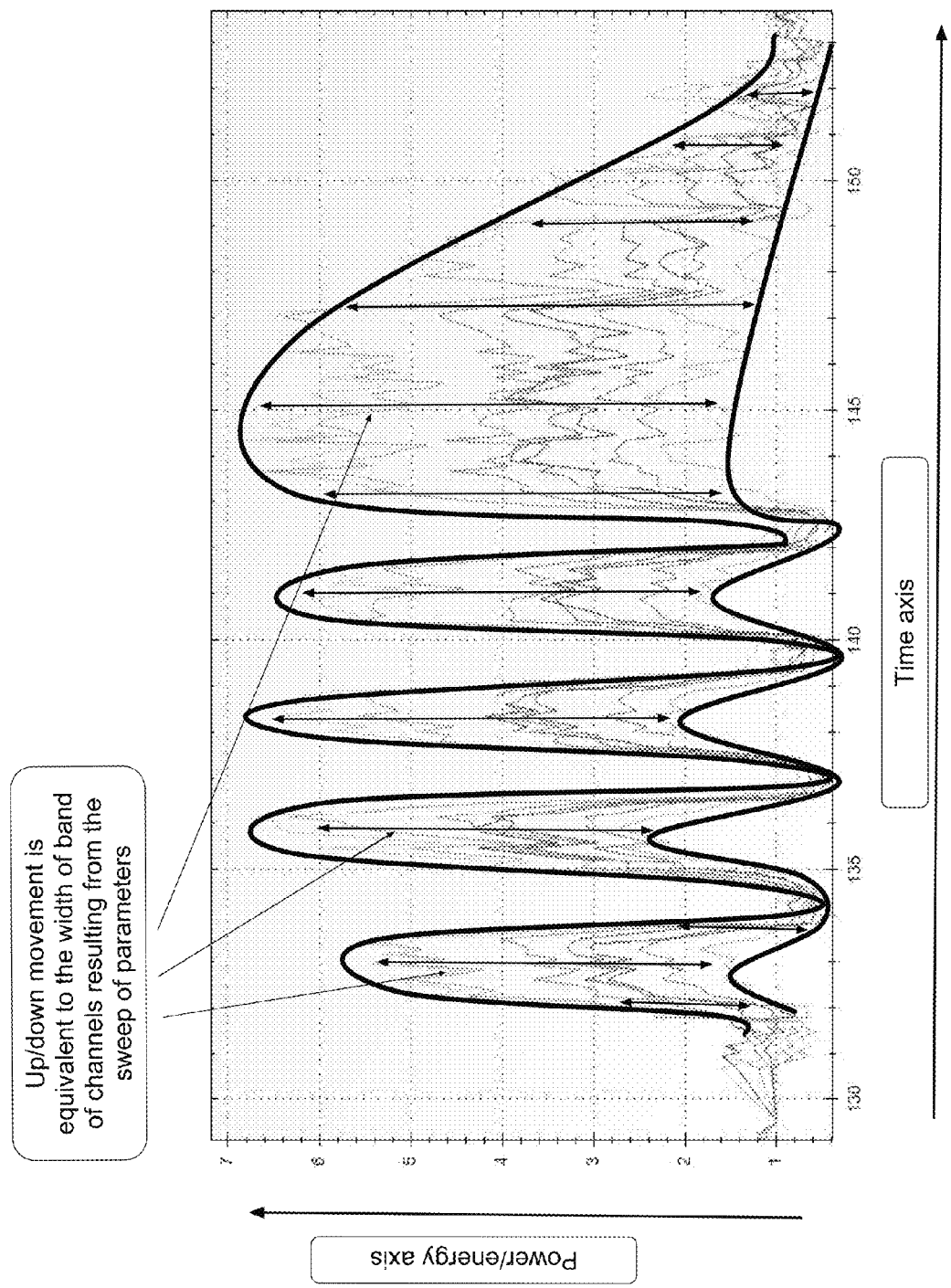
FIG. 9 represents the results of the sweep of FIG. 8.

In FIG. 9, the results of the sweep of FIG. 8 are shown again with a greater detail. It is shown how the range of results of the sweep is a measure for the gaze direction. Since this input for gaze mostly depends on the kernel, to a large degree the effect of variations in light conditions and noise are eliminated.

Figure 10:
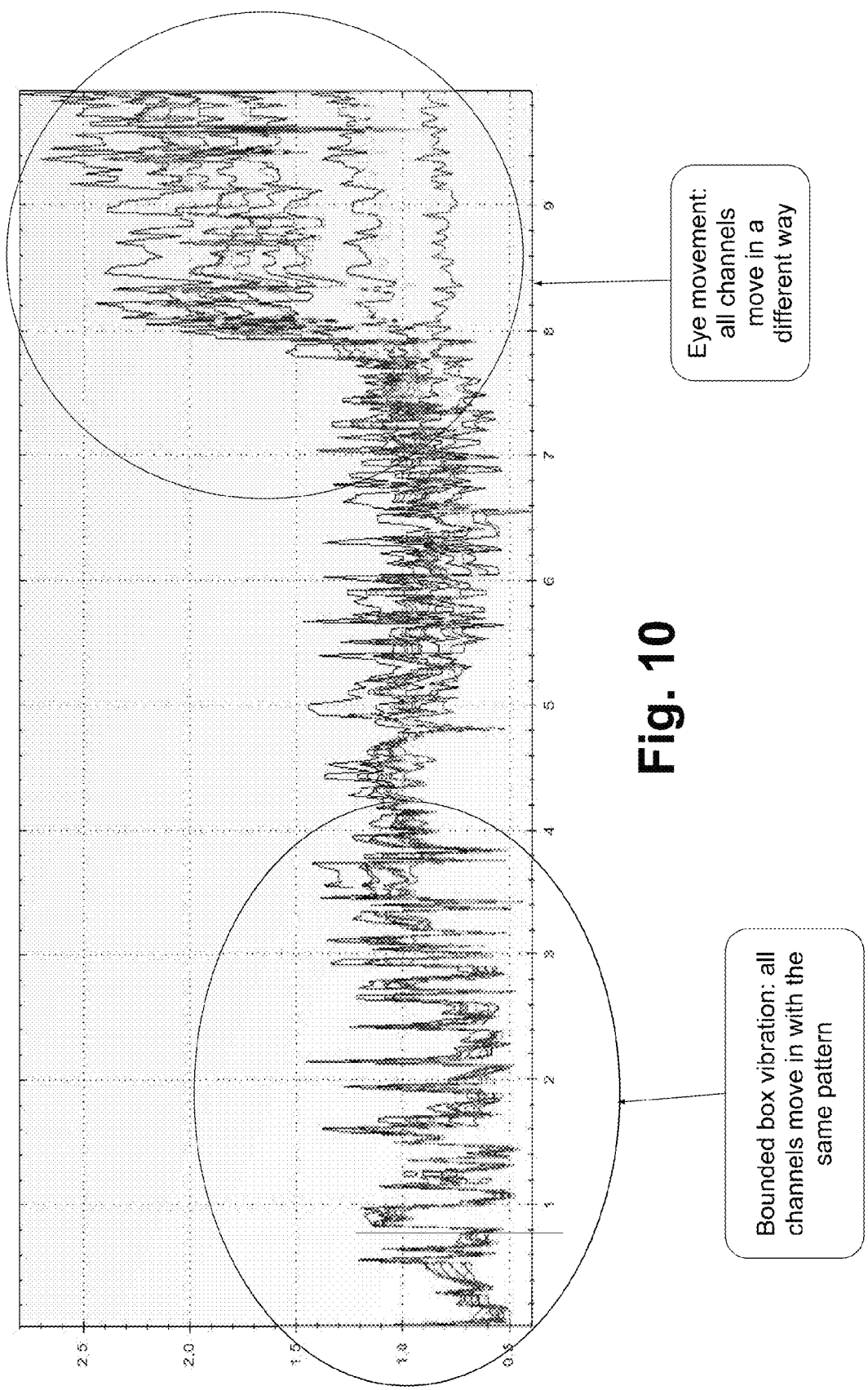
FIG. 10 shows the elimination of noise factor in the channels by using the range resulting from a sweep.

FIG. 10 shows how to use the range resulting from a sweep to eliminate noise factors in the channels. In the first part of the telemetry, the user is looking straight and there is a large noise factor in the input, for example caused by the vibration of the bounded box position, i.e. vibrations affecting a hand-held camera and/or the involuntary eye movements.

With the user fixing his gaze in the same direction, all the channels in the sweep will show the same offset due to the noise. Therefore, by taking the width of the sweep as input, since the width remains small with all channels changing equally, noise is largely eliminated from the gaze channel.

In the second part (right part) of the plot, the user starts to change the gaze direction and all the channels in the Kernel sweep react lightly differently to this change. The width of the sweep can now be taken as an input for the gaze direction.

Figure 11A:
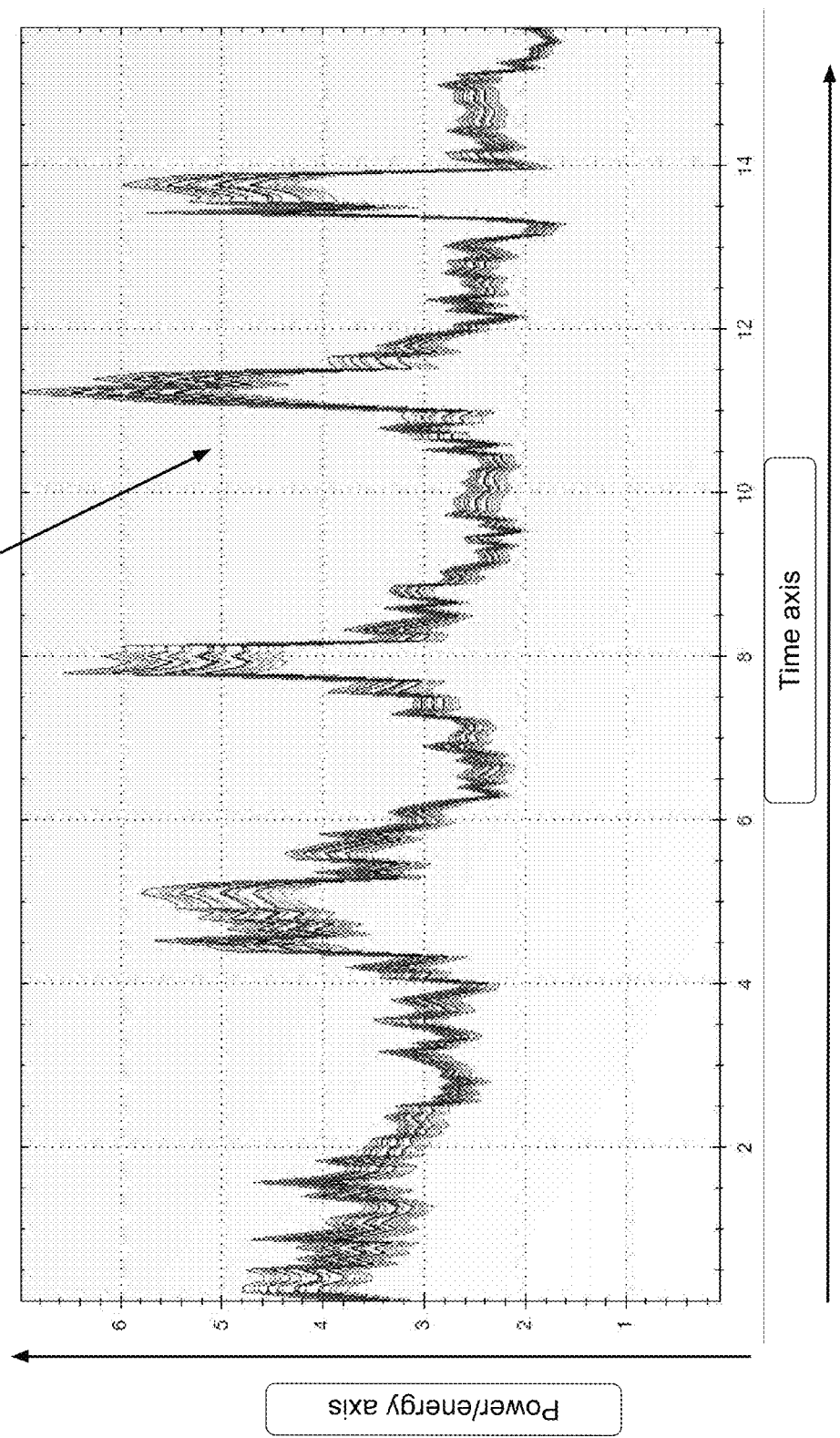
FIG. 11a shows logged data for a gaze direction formula.

FIG. 11a shows logged data for a gaze direction formula, wherein a sweep of wavelength, orientation and phase has been implemented. The width of the band is a measure for the gaze direction. No normalization of the channels has been done.

Figure 11B:
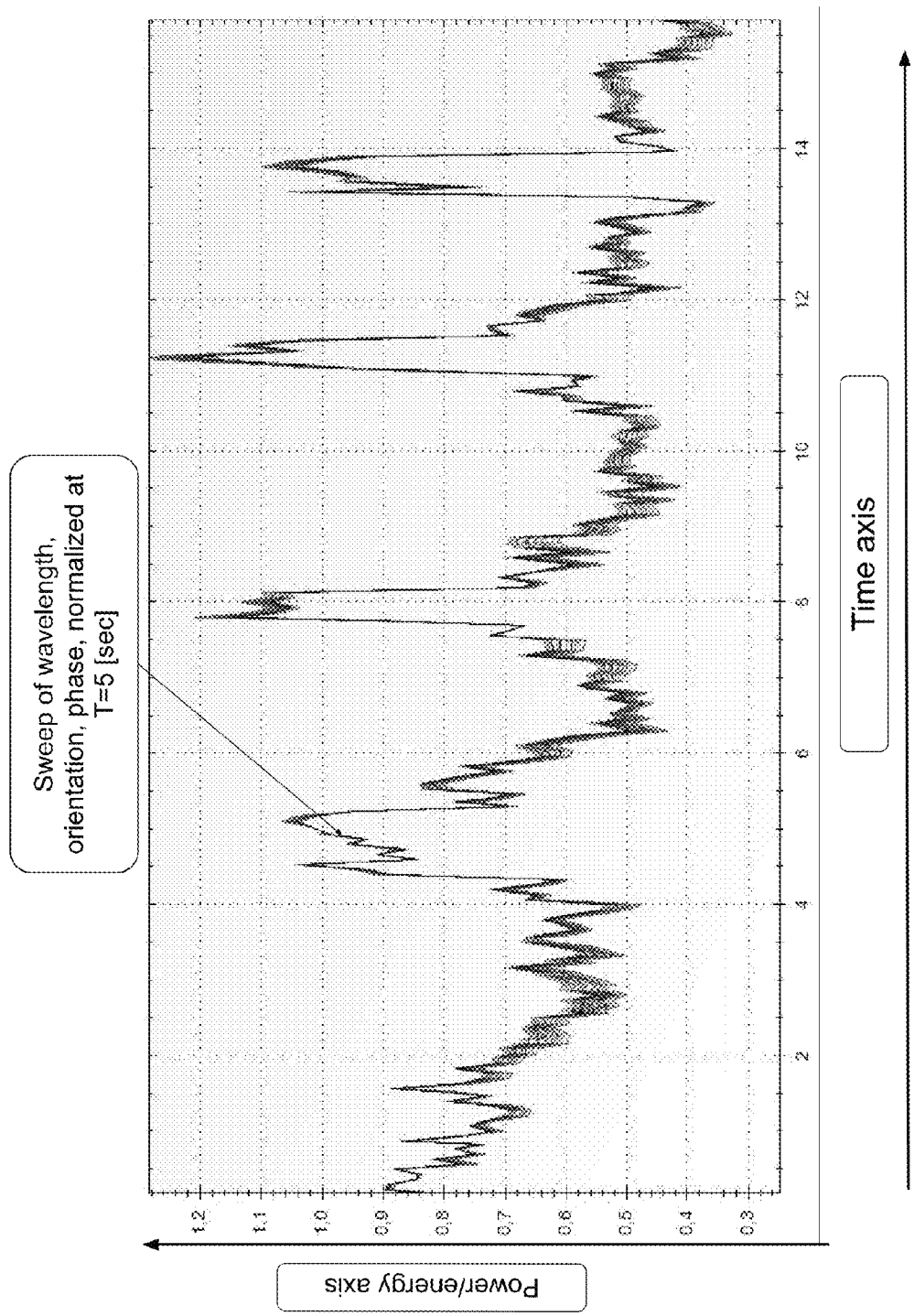
FIG. 11b shows the same logged data as FIG. 11a with the channels normalized at T=5 [sec]

FIG. 11b shows the same logged data as FIG. 11a. However, now the channels have been normalized at T=5 [sec]. The width of the band is still a measure of the gaze direction, but now it is more robust for any effect such as changes in lighting.

FIG. 11c shows the same logged data as FIG. 11a and FIG. 11b. However, now the channels have been normalized at T=10 [sec], which is the other end of the gaze movement. The width of the band is still a measure of the gaze direction, just like for FIG. 11a it is now more robust for effects such as changes in lighting. It can be seen however that taking the normalization at the other end of the gaze movement requires a different calibration.

Figure 12:
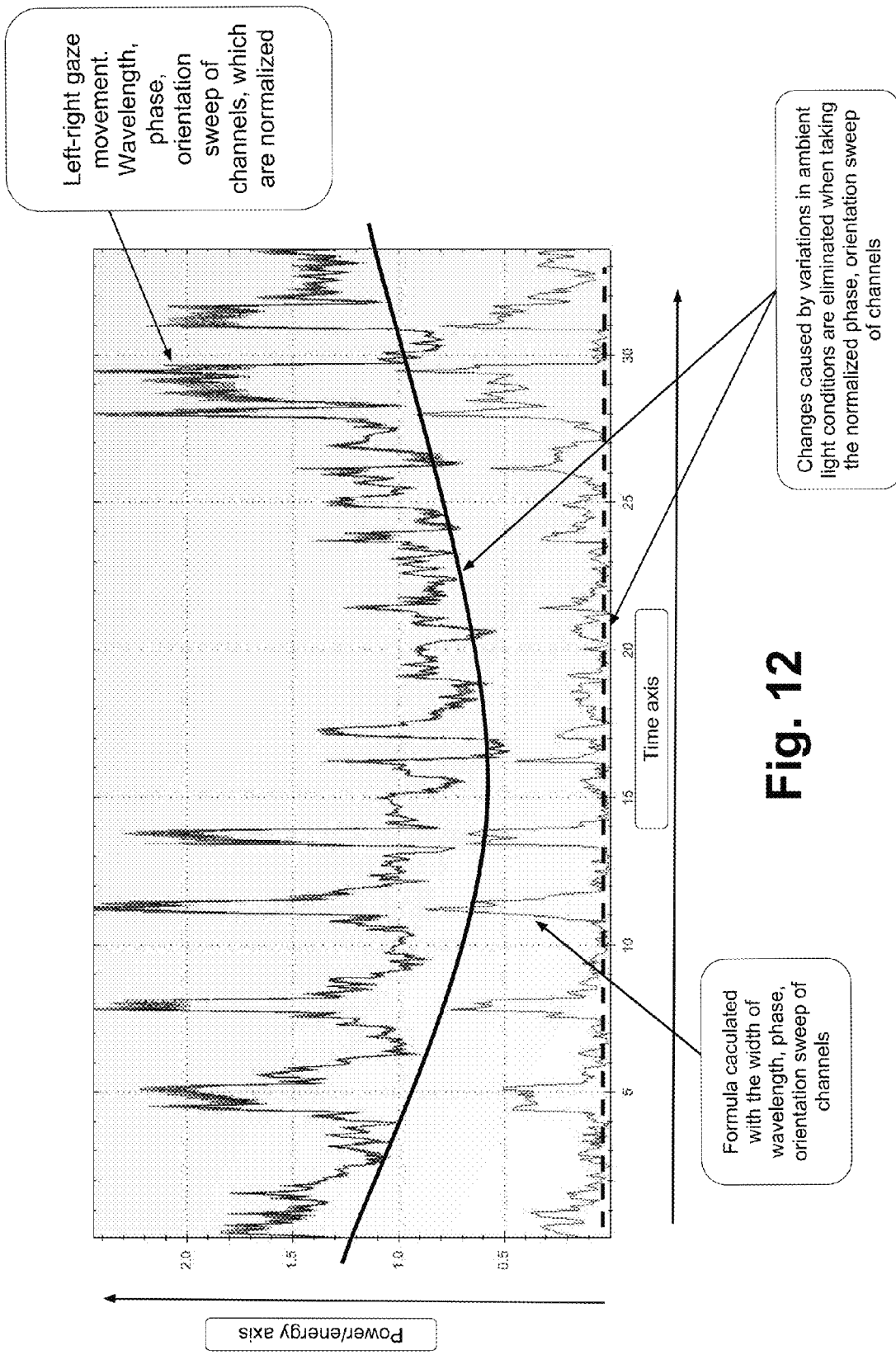
FIG. 12 shows a larger portion of the gaze movement captured in FIGS. 11a, 11b and 11c.

FIG. 12 shows a larger portion of the gaze movement captured in FIGS. 11a, 11b and 11c. On the top, the normalized sweep of channels is represented. On the bottom of the figure, the result of the formula, which is calculated from the width of the normalized sweep, is shown. During these gaze movements, light conditions changed, as shown by the curved line that the raw sweep channels follow. However, in the plot it can be appreciated that in the results of the formula the effects of the variations of light conditions have been largely eliminated.

In the following figures an example is shown of the steps of how a channel might be sought for a gaze direction without the engineer or designer of the gaze channels having any baseline channels to begin with.

Figure 13:
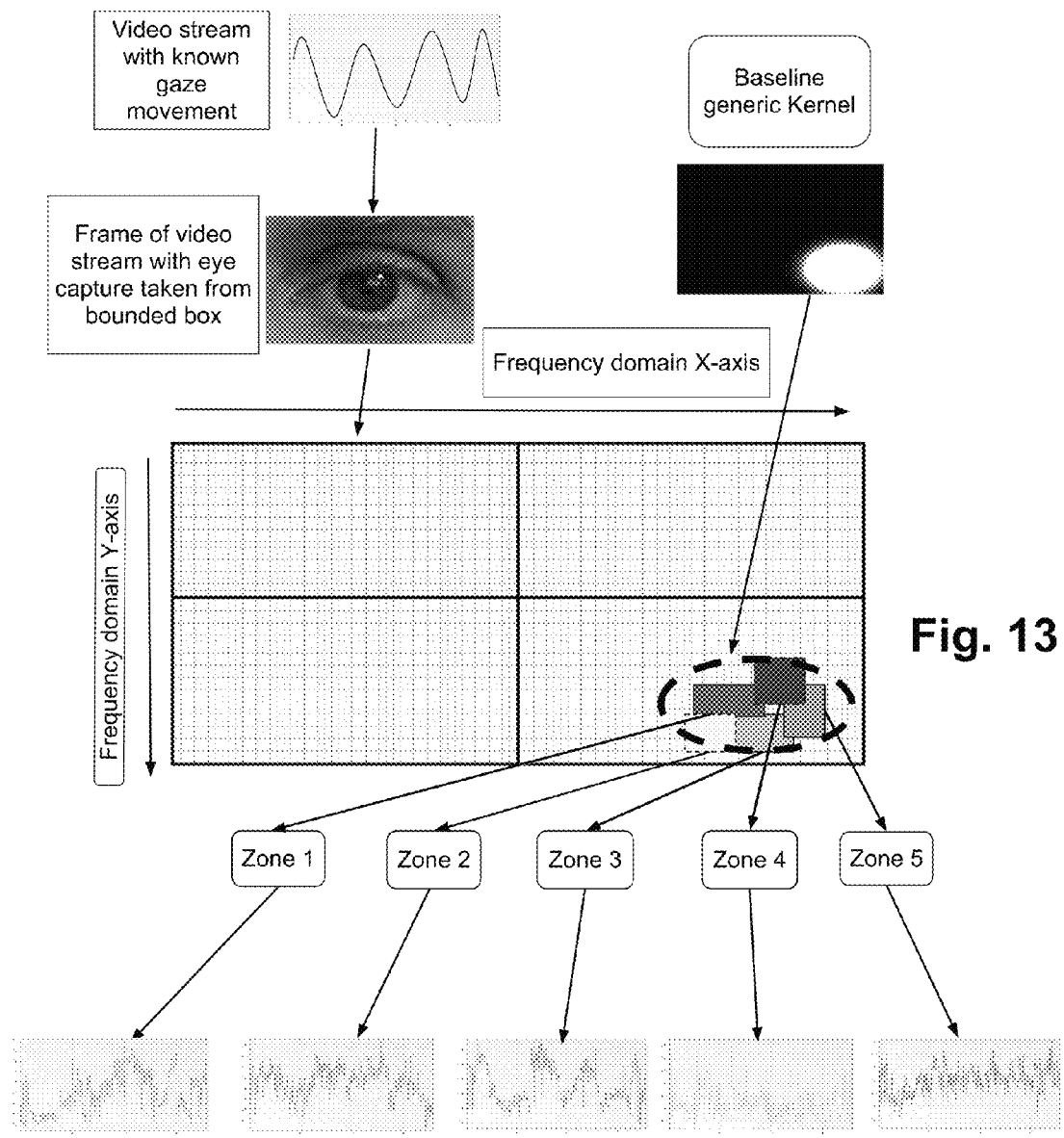
FIG. 13 shows an example of gaze tracking from a video input, with an eye in front of a camera changing gaze direction from left to right.

FIG. 13 shows how a frame of a video input is given, either recorded or live, of the eye in front of camera changing gaze direction, for example from left to right.

Since the correct sparse zone for capturing the movement is not yet known, different sparse zones are chosen. In this example five zones are indicated, but it will become clear that many different other ones may be chosen for this test.

Also the best kernel for accentuating the movement is not known yet, so a baseline kernel is taken, and it is kept constant without any sweeping.

In the example, it is seen how, for each chosen zone, the frequency data of the image deriving from the transformation from the spatial domain are multiplied with the kernel only within each sparse zone of the frequency domain field.

After this calculation, done frame by frame for the whole video input, five telemetry streams are obtained and the most appropriate sparse zone can then be selected for the given eye type. In the example, it is possible to understand that zone No. 3 is likely the best for capturing the left-right movement for the given eye. This determination is made according to the noise signature of each telemetry: the one having the best signal-to-noise ratio shall be the best representation of the movement.

Figure 14:
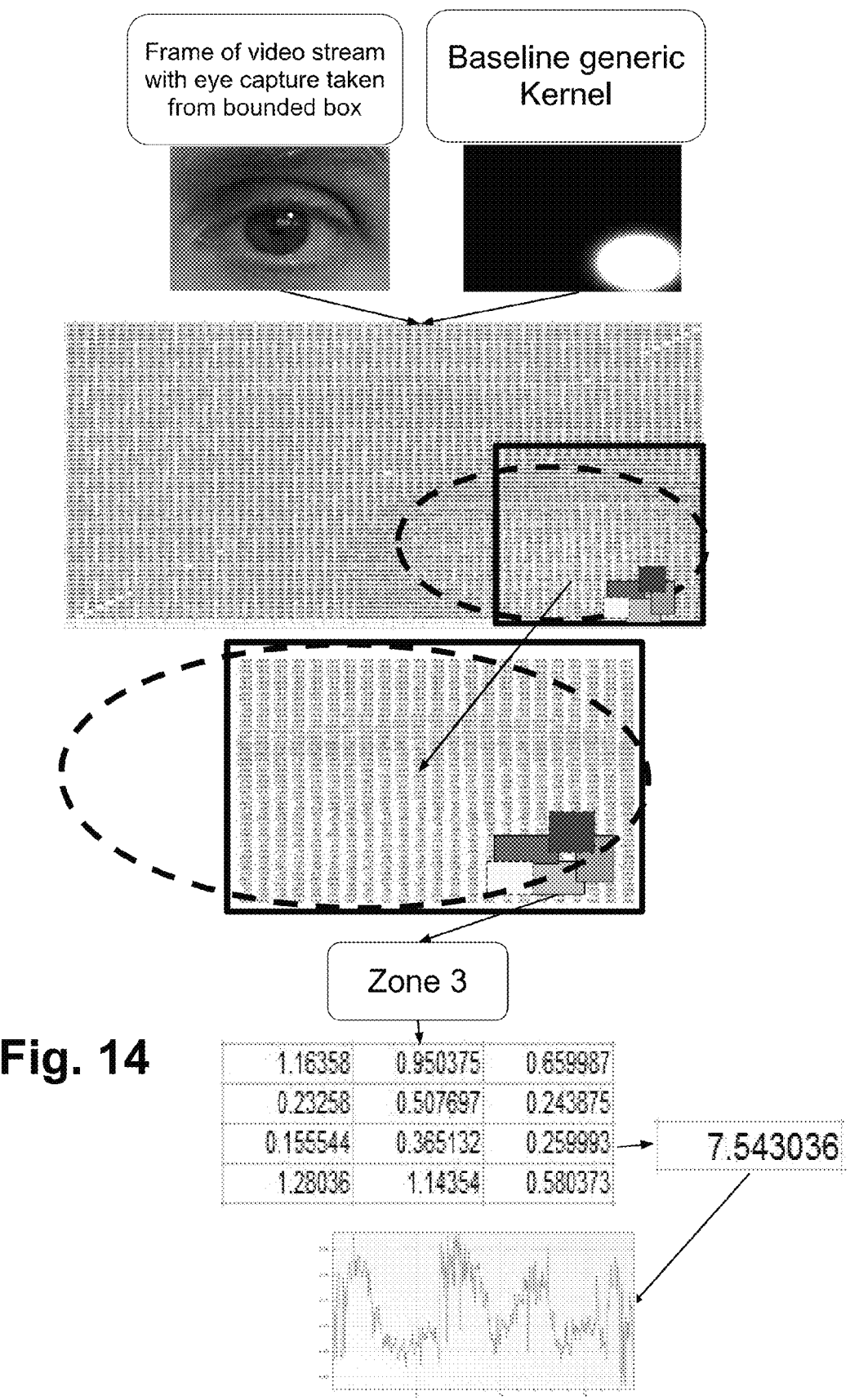
FIG. 14 shows in greater detail the performing of calculations done for a single frame.

In FIG. 14 it is possible to see in greater detail how such calculation is done for a single frame with the same five zones of FIG. 13. In the example, both the input image frame and the kernel each have a 64×64 size in the frequency domain, after the transformation. The values of the kernel are a magnitude for each cell depending on the calculated real and imaginary components of the kernel in the frequency domain. Taking the magnitude of these complex number multiplications multiplied with the image transformed into the frequency domain, then together it gives the shown 64×64 grid of values.

Taking into account zone No. 3, i.e. the better zone to capture the eye movement (see above), it will be clear to a man skilled in the art that, in this case of full cell-by-cell multiplications between the image in frequency domain and the kernel, that 64*64=4096 calculations are required.

In the enlargement of FIG. 14, the sparse zone No. 3 consists of 12 cells with 4×3=12 frequency data. An expert in the field of frequency domain calculations will realize that, if only the values in the defined sparse zone are required, and also if it is not necessary to transform the image back to the spatial domain, then 12 cell-by-cell calculations will suffice, instead of the 4096.

In the final step shown in FIG. 14 we see how the sum is taken of the values in zone No. 3 to arrive at a single number. In this example the sum is taken, but of course it is possible to define different rules to arrive at a single value coherent with the starting frequency data.

Hence, the input frame leads to a faster sparse calculation giving a single value. Repeating these calculations for every single frame, fluctuations in these values will result in giving the telemetry stream values related to time which will be correlated to the chosen gaze direction, provided that the sparse zone and kernel are chosen well.

As shown in FIG. 9, the output value used for capturing a gaze direction will be more robust to changes in lighting and such if a small sweep of such kernel parameters is performed and the variation in the outputs is taken as the value for the telemetry stream.

Figure 15:
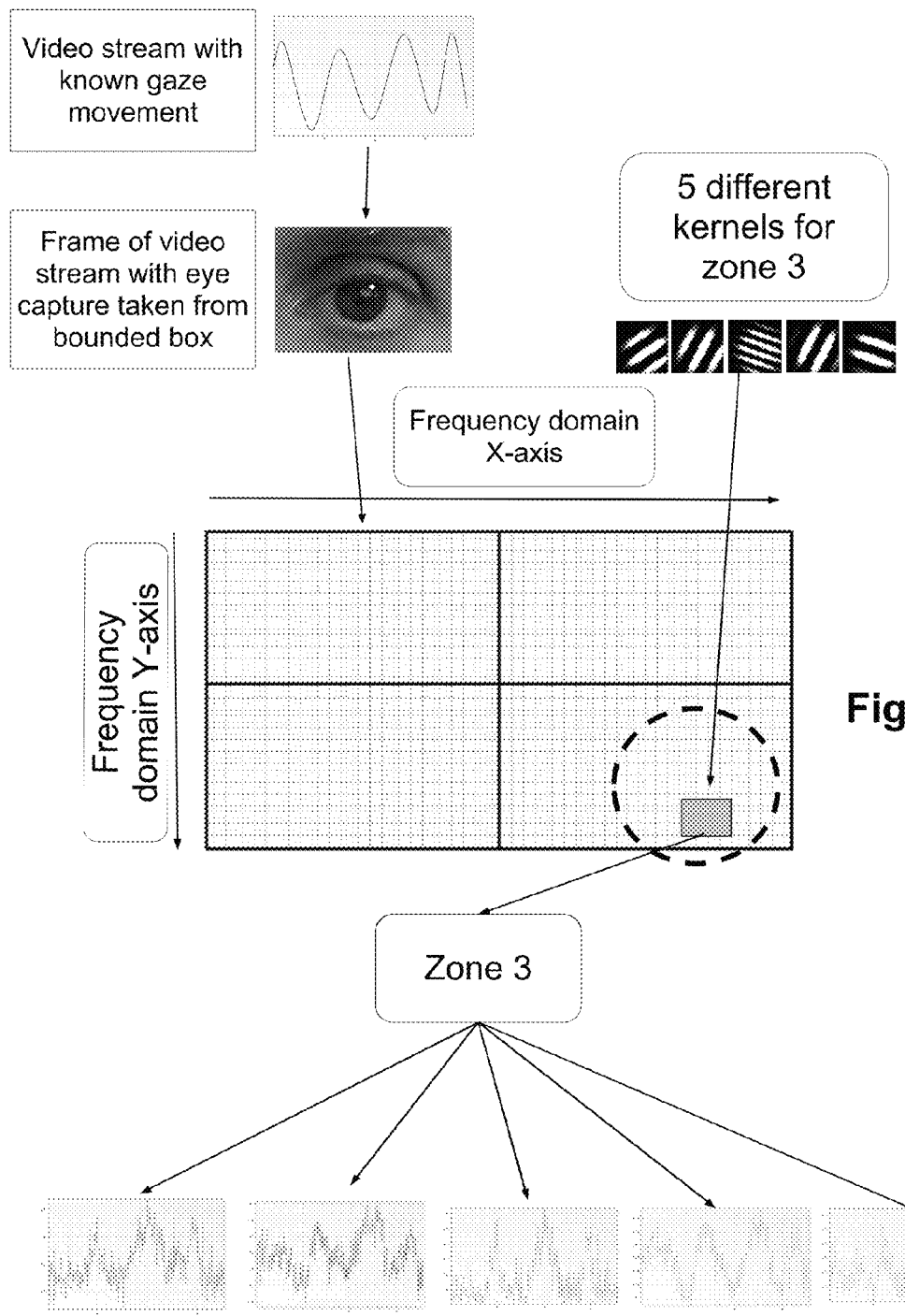
FIG. 15 shows the adjustment of the kernel parameters to improve the signal-to-noise ratio of the output for a chosen gaze direction.

While FIG. 13 showed a method that can be used to find the sparse zone for the chosen gaze direction movement, FIG. 15 shows how, in a further step, the kernel parameters are then adjusted to improve the signal-to-noise ratio of the output for the chosen gaze direction.

The starting point is the chosen sparse zone for capturing the left-right gaze movement, which, in the example of FIG. 13, was zone No. 3. This sparse zone is now kept constant, while now the kernel parameters, such as phase, wavelength and orientation are adjusted. This can be applied to other parameters, depending on the formula used for the frequency domain kernel.

By performing variations in these parameters improvements in the signal-to-noise ratio can be obtained for capturing the chosen gaze direction.

In the example, five different kernels are shown in input, i.e. five different sweeping produced in a starting kernel formula. All the five kernels capture in varying degrees the chosen gaze movement. This is because the sparse calculations are already in a sparse zone that captures the movements, as shown in FIG. 13. We see that, in the example of FIG. 15, the fourth kernel is the best for capturing the movement.

Again, this determination is made according to the noise signature of each telemetry: the one having the best signal-to-noise ratio shall be the best representation of the movement.

It will be clear to the man skilled in the art that this is only an illustrative example and that, only initially, a large number of variations to the kernels will be required. It will also be clear to the man skilled in the art that, when kernels are found effectively capturing the gaze movement in combination with the chosen sparse zone, the kernels will constantly capture the gaze direction, provided the eye type, lighting type, head orientation relative to the camera and relative size of the bounded box of the input image remain constant.

It will also be clear to experts that one baseline setting is found for a given eye type, lighting type and head orientation relative to the camera; it will not be necessary to repeat the steps described in FIG. 13 and FIG. 15, but the results of these steps can be stored. In the examples given in FIG. 13, FIG. 14 and FIG. 15 it can be seen how the sparse zone and kernel for one eye type is sought.

It is now clear that this process can be repeated for different eye types, lighting conditions and such and that for each type the most appropriate sparse zone and kernel are saved.

It is also clear that once the gaze direction signal is calibrated, further refinements in the signal-to-noise ratio are possible. Instead of having a fixed sparse zone and a fixed kernel for a given eye type, they can shift along with the known gaze movement. Hence, an eye looking slightly to the left would result in the kernel and/or sparse zone changing slightly in accordance with these known eye direction changes resulting in a further refinement of the gaze direction signal-to-noise ratio.

This aspect underlines the importance of the classification steps described in FIGS. 2a, 2b, 3a, 3b, 4a and 4b, since the classifier will recognize the eye type as such and it will indicate the best choice between the saved sparse zones and kernels to capture the gaze direction.

In the examples of FIG. 13 and FIG. 15 it is mentioned that the sparse zones and kernels are chosen to optimize the capturing of the left-right gaze movements. It will be clear that the same principles can be followed to capture the up-down movement. It will be also be clear that for capturing upside-down gaze movements these steps will lead to different sparse zones and different kernels than chosen for the left-right movement.

It will also be clear to the man skilled in the art that these steps can be either done in offline steps or in real-time.

Figure 16:
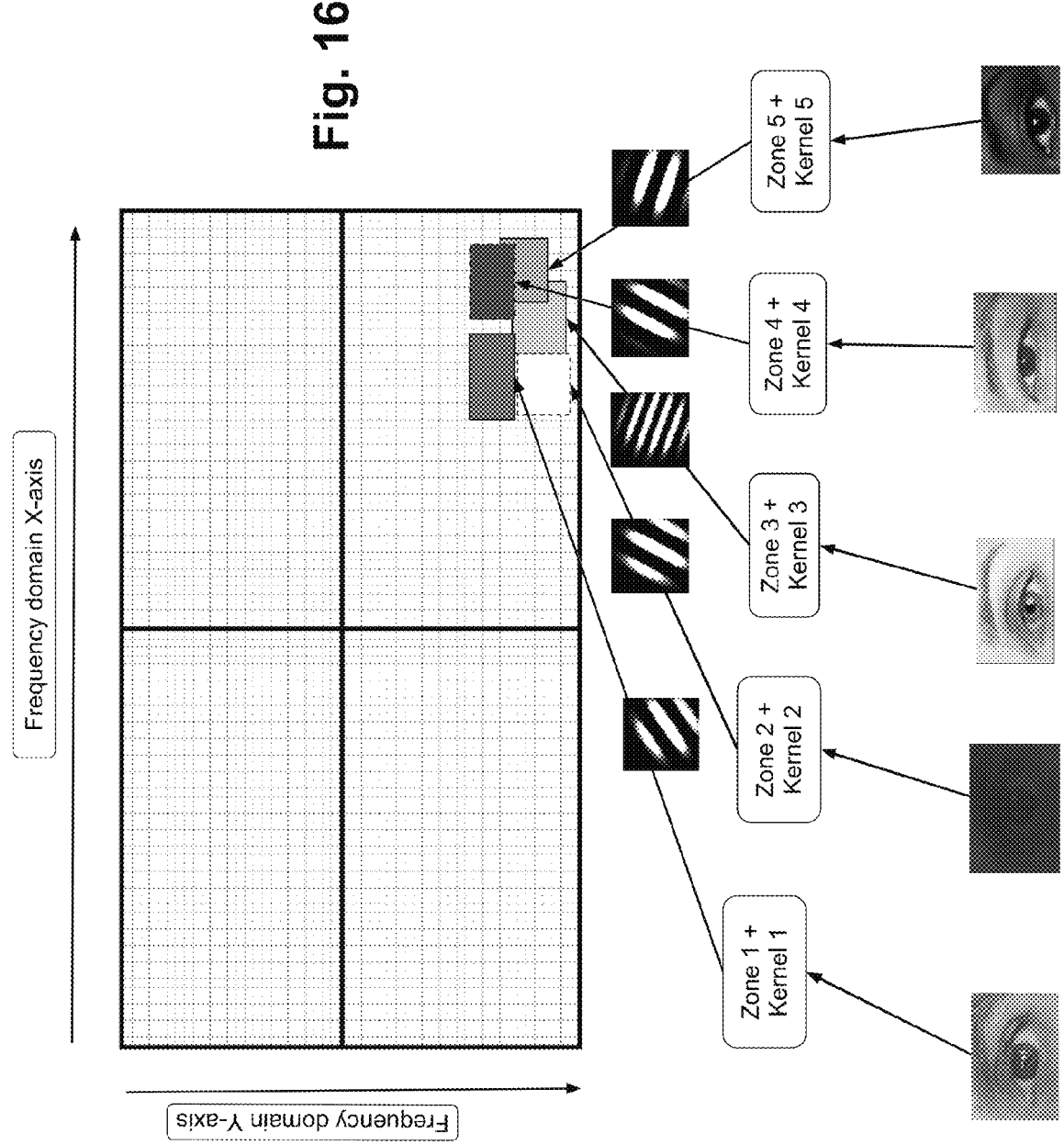
FIG. 16 illustrates how, for each eye type and lighting condition, different combinations of sparse zone and kernel are required for capturing the gaze directions.

In FIG. 16 it is illustrated how, for each eye type and lighting condition, different combination of sparse zones and kernels are required for capturing the gaze directions. It will be clear to the man skilled in the art that the signal-to-noise of the gaze direction signal and the reduction in amount of required calculations depends on the refinement sought, with the chosen sparse zones and kernels.

In principle, a large zone can be chosen with a generic kernel but this would likely lead to a very poor gaze direction signal and to a less gain in the speed of calculations.

In view of the above described method for gaze tracking, it should be noted that four channels may be used (left, right, up, down) channels, but also only two channels: one for left/right and one for up/down, may work.

In the case of smartphones and tablet, it is not important to accurately capture the gaze direction when it lies off-screen, but the detection of small changes in the gaze direction on the screen matters.

Instead of using classifiers to determine the most appropriate zones and formulas for a light condition and individuals eyes, it is also possible to have a number of possible options ready for channels and use a calculation like signal-to-noise during calculation to determine the one giving the best result for the conditions.

The size of eye bounded box is proportional to distance between pupils, leading to a more stable bounded box. However, further options for obtaining such stable bounded box could be used, for example making the bounded box related to the pupil size or the eye size. Bounded box can be either fixed to the pupil or the eye.

The above sparse zones need not to be a square or a rectangle, and they need not to be fixed.

It is also meant that the present method may be used to track different objects in the spatial domain rather than eyes, such as a pupil or eyelid, through the frequency domain. This movement in the spatial domain is captured in the frequency domain in specific frequency zones, with a Kernel defined by wavelengths of certain frequencies, real and imaginary values, which have a phase, the sinusoids of a specific orientation, and a Gaussian filter of certain strength.

The present method does not require the use of infrared light and the recognition of glint in the eye created by infrared projection. It which does not require the user to sit perfectly straight and still in front of the camera and does not limit the user to a small movement box in front of the camera.

Further, this method does not require stereo vision with more than one camera, allowing a full software solution, which can either be integrated in an operating system or outside of an operating system programmed directly onto a processor or other re-programmable hardware.

Neither the recognition of the position of facial features in the spatial domain is requested to calculate the gaze direction, and no interpolation is performed between classified eye positions in the spatial domain.

The invention claimed is:

1. A method for gaze tracking, comprising:
   a. obtaining a digital video stream of a face through a camera, wherein eyes and/or pupils are recognized, to determine a position of said eyes and/or pupils, said eyes and/or pupils being then identified in corresponding boxes in a spatial domain, a content of the boxes being an input for further calculations;
   b. transforming, by a processor, the content of the boxes into a frequency domain content;
   c. applying to the frequency domain content of said boxes one or more sparse zones by a processor, covering together a fraction of a boxed frequency domain area, and a filtering kernel, at least partially overlapping said one or more sparse zones;
   d. performing, by a processor, a multiplication between frequency data within each sparse zone and said kernel, combining the results in a single value;
   e. repeating above steps (a) to (d) obtaining for each frame of said digital video stream said single value, wherein fluctuation of said single value is representative of gaze direction changes in time; and
   f. sweeping kernel parameters by a processor, to produce an array of values to be processed into a single value; wherein each sparse zone corresponds to a single channel, and wherein step (e) leads to a single vector of values changing frame by frame.

2. The method according to claim 1, further comprising estimating, by processor, a head orientation and possibly further facial features from said position of the pupils and eyes.

3. The method according to claim 2, further comprising using a predetermined classifier to classify type of light conditions and type of eyes of the user for each eye.

4. The method according to claim 1, wherein said boxes are centred relative to the respective pupils.

5. The method according to claim 1, wherein said boxes are applied to one eye only.

6. The method according to claim 1, further comprising calibration of gaze direction at initialization.

7. The method according to claim 6, wherein the calibration is a direct calibration of gain and offset.

8. The method according to claim 6, wherein the calibration is performed normalizing the single values at a certain time.

9. The method according to claim 6, wherein the calibration is stored, by combining a real-time training of classifiers for the eyes of the user with saved calibrations for the conditions, allowing user recognition without need to re-calibrate.

10. The method according to claim 1, wherein said kernel comprises a two dimension filter.

11. The method according to claim 10, wherein the two dimension filter is a Gabor filter.

12. The method according to claim 2, further comprising updating, by a processor, states defining said boxes around the eyes, the face position and orientation relative to said camera after end of a last gaze calculation cycle from the digital video stream.

13. The method according to claim 12, further comprising repeating determination of the sparse zones and kernels to be used for each gaze direction and each eye after end of a last gaze calculation cycle from the digital video stream.

14. The method according to claim 1, wherein step (b) is performed by a processor adopting a Discrete Fourier Transformation.

15. The method according to claim 1, wherein step (b) is performed by a processor adopting a Fast Fourier Transformation.

16. The method according to claim 1, wherein step (b) is performed by a processor adopting a Görtzel algorithm.

17. The method according to claim 1, wherein said single value is a sum of values within a sparse zone.

18. The method according to claim 1, further comprising performing calculation in parallel by a processor in case of a plurality of given sparse frequency zones and kernels.

19. A method for operating a device provided with at least one digital camera configured to produce a video stream and at least one processor, to obtain a gaze tracking when a face is captured in said video stream, comprising:
   a. identifying eyes or pupils and framing the eyes or pupils in corresponding boxes in a spatial domain, size of the boxes being function of face position and orientation relative to said camera, content of the boxes being an input for further calculations;
   b. transforming, by a processor, content of the boxes into a frequency domain content;
   c. applying to the frequency domain content of said boxes one or more sparse zones by a processor, covering together a fraction of a boxed frequency domain area, and a filtering kernel, at least partially overlapping said one or more sparse zones;
   d. performing, by a processor, a multiplication between frequency data within each sparse zone and said kernel, combining the results in a single value for each sparse zone;
   e. repeating above steps (a) to (d) obtaining for each frame of said digital video stream said single value, wherein fluctuation of said single value is representative of gaze direction changes along time; and
   f. sweeping kernel parameters by a processor, to produce an array of values to be processed into a single value;
   wherein each sparse zone corresponds to a single channel, and wherein step (e) leads to a single vector of values changing frame by frame.

* * * * *